(12) United States Patent
Gauza et al.

(10) Patent No.: US 8,377,331 B2
(45) Date of Patent: Feb. 19, 2013

(54) LIQUID CRYSTALS COMPOSITION AND LIQUID CRYSTAL DISPLAY WITH PATTERNED ELECTRODES

(75) Inventors: Sebastian Gauza, Winter Springs, FL (US); Shin-Tson Wu, Oviedo, FL (US); Zhibing Ge, Oviedo, FL (US); Linghui Rao, Orlando, FL (US); Hsu-Kuan Hsu, Shanhua Township, Tainan County (TW); Chao-Lung Chin, Tainan (TW)

(73) Assignees: University of Central Florida Research Foundation, Inc., Orlando, FL (US); Chimei Innolux Corporation, Miao-Li County (TW)

( * ) Notice: Subject to any disclaimer, the term of this patent is extended or adjusted under 35 U.S.C. 154(b) by 23 days.

(21) Appl. No.: 12/793,451

(22) Filed: Jun. 3, 2010

(65) Prior Publication Data

US 2011/0075074 A1    Mar. 31, 2011

Related U.S. Application Data

(60) Provisional application No. 61/246,718, filed on Sep. 29, 2009.

(51) Int. Cl.
*C09K 19/00* (2006.01)
*C09K 19/02* (2006.01)
*C09K 19/06* (2006.01)
*C09K 19/52* (2006.01)
*G02F 1/1333* (2006.01)

(52) U.S. Cl. ........... 252/299.6; 252/299.01; 252/299.61; 252/299.62; 252/299.63; 252/299.64; 428/1.1; 428/1.3; 349/1; 349/56; 349/182

(58) Field of Classification Search ............ 252/299.01, 252/299.6, 299.61, 299.62, 299.63, 299.64; 430/20; 349/1, 56, 182; 428/1.1, 1.3
See application file for complete search history.

(56) References Cited

U.S. PATENT DOCUMENTS 4,751,017 A * 6/1988 Wachtler et al. ......... 252/299.61
5,072,021 A * 12/1991 Nakatsuka et al. ...... 252/299.01

OTHER PUBLICATIONS

Kikuchi, et al., 39.1: Invited Paper: Optically Isotropic Nano-Structured Liquid Crystal Composites for Display Applications, SID Digest, 2009, pp. 578-281.
Ge, et al., Electro-Optics of Polymer-Stabilized Blue Phase Liquid Crystal Displays, Applied Physics, 2009, pp. 101104-1-101104-3, vol. 94.
Yang, et al., Control of Reflectivity and Bistability in Displays Using Cholesteric Liquid Crystals, J. Appl. Phys., 1994, pp. 1331-1333, vol. 76, issue 2.
Choi, et al., Optically Isotropic-Nanostructured Liquid Crystal Composite with High Kerr Constant, Appl. Phys. Letters, 2008, pp. 043119-1-043119-3, vol. 92.
Yan, et al., Extended Kerr Effect of Polymer-Stabilized Blue-Phase Liquid Crystals, Appl. Phys. Letters, 2010, pp. 071105-1-071105-3, vol. 96.

\* cited by examiner

*Primary Examiner* — Geraldina Visconti
(74) *Attorney, Agent, or Firm* — Brian S. Steinberger; Phyllis K. Wood; Law Offices of Brian S. Steinberger, P.A.

(57) ABSTRACT

A blue phase liquid crystal composition and a LC display using the composition. The liquid crystal composition includes a first class including a highly polar compound and a second class including a highly conjugated liquid crystal compound. The blue phase liquid crystal display device includes first and second substrates each with polarizer on the exterior surface and the blue phase liquid crystal composition sandwiched therebetween with and patterned electrodes on one of the substrates or both substrates. The patterned electrodes can be T-shaped, chevron or v-shaped, thin comb like shape and can also be flat or trapezoidal. The device outputs different light transmissions from the electrically controllable induced birefringence of the blue phase LC material for a low driving voltage, high transmittance blue phase liquid crystal display device.

24 Claims, 26 Drawing Sheets

LIQUID CRYSTALS COMPOSITION AND LIQUID CRYSTAL DISPLAY WITH PATTERNED ELECTRODES This application claims the benefit of priority to U.S. Provisional patent application No. 61/246,718 filed on Sep. 29, 2009.

FIELD OF THE INVENTION AND ART

This invention relates to a liquid crystal composition and, in particular, to methods, systems and devices for a liquid crystal mixture that exhibits blue phase and is intended for a polymer stabilized composite and a liquid crystal display comprising the same.

BACKGROUND OF THE INVENTION AND ART

Liquid crystal display devices are widely used in the optical data processing field. The conventional liquid display modes include twister nematic, STN, in-plane switching, vertical alignment, multi-domain vertical alignment (MVA), OCB and the like. All of these modes cause the liquid crystal molecular orientation already under control to change into a different state of orientation when electrical fields are applied and change the polarization direction and polarization state of the transmitted light. The changes are converted into light and dark contrasts in polarized boards and the like to generally form a display.

These conventional liquid crystal display modes all require a surface orientation treatment in order to control the liquid crystal molecular orientation. A rubbing treatment is needed with the particular exception of multi-domain vertical alignment (MVA). The rubbing treatment is an operation in which a cloth or the like is used to rub an alignment film that has been surface coated onto a substrate surface and is in contact with liquid crystals, and is the cause of increased costs associated with fine dust and fine electric discharge which occurs due to high voltage static electricity.

The dusts cause a problem in highly fine pixel electrodes and thin-film transistors forming process in which film deposition, exposure, etching are repeated. The local electric discharge would damage the alignment film, or cause disconnection or electrostatic discharge damage in thin-film transistors and transparent electrode such as ITO. The existence of fine dust particles or fine electric discharge will result in declining yields and poorer display qualities. In addition, all of the modes described above use nematic liquid crystals, and their response times are about several milliseconds at the shortest, thus limiting their application in dynamic picture displays used for television.

To resolve the problems, the co-inventors have developed a chiral nematic liquid crystals for use in liquid crystal display devices. The development of a polymer-stabilized blue phase liquid crystal composite of the present invention to be used in place of the conventional nematic liquid crystals in order to solve the problems described above. A polymer-stabilized blue phase liquid crystal composite of the present invention is optically isotropic when no electrical field is applied, and the orientation does not need to be controlled.

The co-inventors have also developed a liquid crystal configuration using the novel blue phase liquid crystal composite in a novel mode involving no double refraction in the absence of an electrical field and a phenomenon that induces double refraction under applied electrical fields. The response time is about one hundred microseconds and is much faster than that of conventional liquid crystal display devices. However, a relatively low clearing point temperature limits application potential of currently existing polymer-stabilized blue phase liquid crystal composites, because the thermal effect from backlight could heat up the liquid crystal to its isotropic state so that the device cannot respond to the electric field.

Currently known polymer stabilized blue phase liquid crystal composites is that they require a relatively high voltage in order to achieve maximum transmittance in a voltage-ON state.

Simultaneously, an in-plane switching (IPS) mode was developed in response to the demand for larger liquid crystal screens and better quality displays. An electric field is applied on an equilibrium surface in a substrate in this mode, and a liquid crystal composite compatible with this mode is being sought. Application of such liquid crystal composite in TFT based display requires low threshold and operating voltages.

SUMMARY OF THE INVENTION

A primary objective of this invention is to provide a liquid crystal composite and a liquid crystal display having the same with a wide operational temperature range of polymer stabilized blue phase.

A secondary objective of the present invention is to provide a liquid crystal composite showing a polymer-stabilized blue phase and a liquid crystal display having the same with low threshold and operating voltages.

A third objective of the invention is to provide new methods, systems and devices for a blue phase liquid crystal display device having a variable low driving voltage.

A fourth objective of the invention is to provide new methods, systems and devices for a blue phase liquid crystal display device that could have a high light efficiency.

The present invention produces a stable polymer stabilized blue phase liquid crystal. By proper use of the present invention shows clearing point temperature of the polymer-LC composite increased to 100° C. and above. Utilizing high optical and high dielectric anisotropy liquid crystals, the co-inventors have obtained compositions with extraordinarily high optical anisotropy and at the same time high dielectric anisotropy. Having both properties at the high level leads to a possibility of reduced thickness of an electro-optical cell of a display and lower threshold and operating voltage compared with common liquid crystal materials used prior to this invention.

An embodiment of the present invention provides a blue phase liquid crystal composition having a core group and at least one of a terminal group and a lateral group connected to the core group in a combination wherein the core group has a first end and a second end and forms a central axis and is selected from a cyclic group consisting of at least one of a phenyl group, a cyclohexyl group and a heterocyclic group; the terminal group attaches to the first end and the second end of the core group and is selected from a non-polar group consisting of at least one of an alkyl group, an alkoxy group, and an alkenyl group and a polar group selected from at least one of fluorine (F), chlorine (Cl), carbon nitride (CN), isothiocyanate (NCS), an alkoxyfluoroakyl radical ($OCF_2$) and carbon trifluoride ($CF_3$) to increase optical anisotrophy through elongated $\pi$-electron conjugation along the principal molecular axis; the lateral group is positioned between the first end and second end of the core group and is selected from a non-polar group consisting of at least one of an alkyl group, an alkoxy group, and an alkenyl group and a polar group selected from at least one of fluorine (F), chlorine (Cl), carbon nitride (CN), isothiocyanate (NCS), an alkoxyfluoroakyl radical ($OCF_2$) and carbon trifluoride ($CF_3$) to increase melting point temperatures of the liquid crystal composition; and the resulting liquid crystal composition exhibits high optical and dielectric anisotropies with operational temperatures in a range between approximately −40° C. and approximately 106° C., low threshold and operating voltage, and light efficiency in liquid crystal display applications.

An embodiment of the present invention provides a liquid crystal component for use in a liquid crystal composition is selected from those of formula (I)

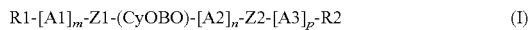

R1-[A1]$_m$-Z1-(CyOBO)-[A2]$_n$-Z2-[A3]$_p$-R2    (I)

wherein R1 and R2 may be the same or different, and R1 and R2 are selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF$_2$) and carbon trifluoride groups (CF$_3$), in which one or more CH$_2$ groups may be replaced by —O—, —S—, —COO—, —CO—, —OCO— or —O—COO—;

A1, A2, and A3 may be the same or different, and A1, A2, and A3 are selected from 1,4-cyclohexylene, 1,4-cyclohexenylene, 1,4-phenylene, 2,6-naphthalene, 2,6-tetrahydronaphthalene, 2,6-dihydronaphthalene, 4,4'-biphenylene, 2- or 3-fluoro, or 2,3-difluo-1,4-phenylene, 7-fluoro, 8-fluoro, 7,8-difluoro, 1,7,8-trifluoronaphthalene, 4'-[2',6',3,5-tetrafluoro]-4-biphenyl, 4'-[2',3,5-trifluoro]-4-biphenyl, 4'-[3,5-difluoro]-4-biphenyl, and 4'-[3-difluoro]-4-biphenyl;

Z1 and Z2 may be the same or different, and Z1 and Z2 are selected from a single bond, —CH$_2$CH$_2$—, —CH=CH—, —C≡C—, —COO—, —CO—, —OCO— and —O—COO—; and m, n and p may be the same or different, and m, n and p are selected from 0, 1 or 2, in which at least one of m, n, and p should be ≧1.

In some embodiments, the liquid crystal composition may further include a highly polar liquid crystal component is selected from

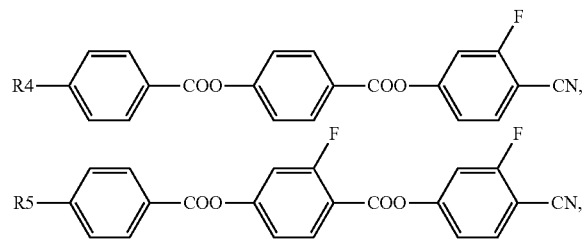

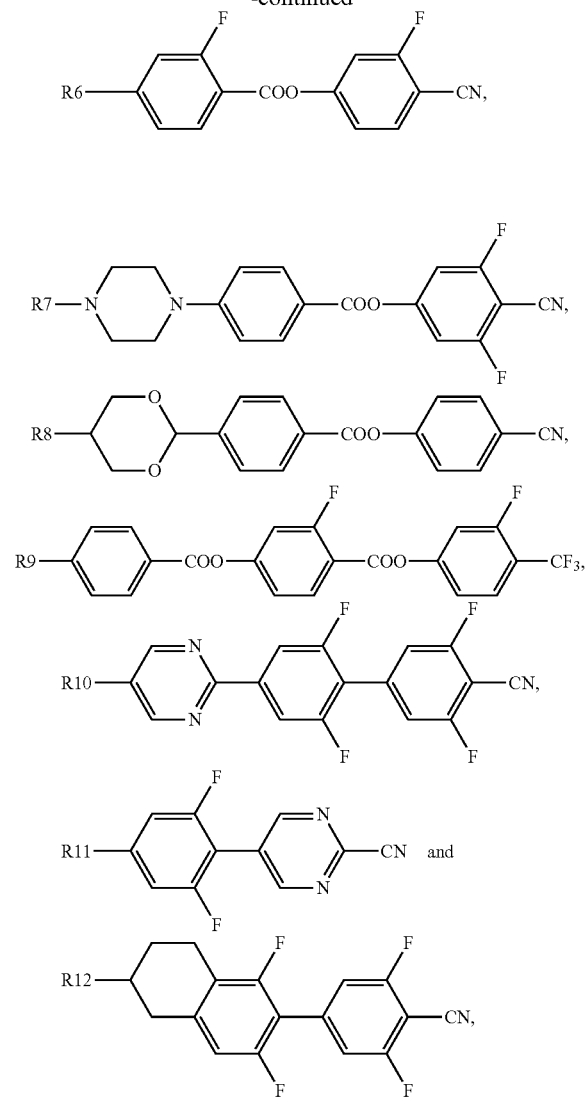

wherein R4 to R12 are selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF$_2$) and carbon trifluoride groups (CF$_3$), in which one or more CH$_2$ groups may be replaced by —O—, —S—, —COO—, —CO—, —OCO— or —O—COO—.

In some embodiments, the highly polar liquid crystal component may further select from

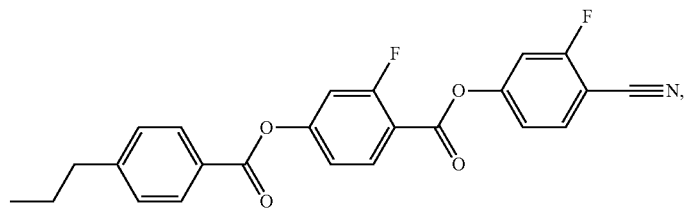

-continued

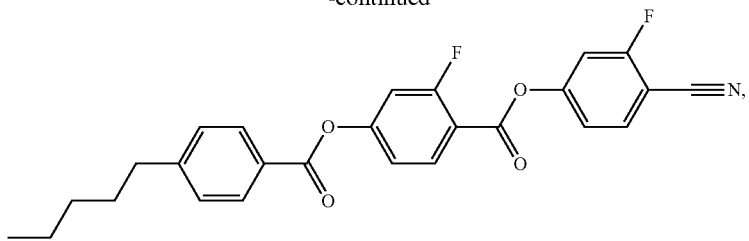

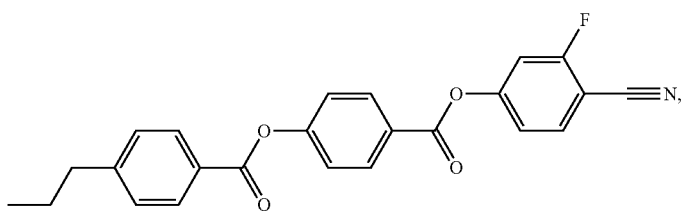

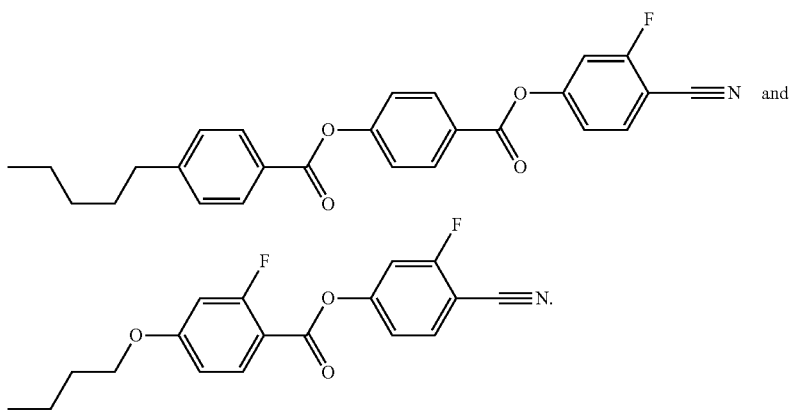

In some embodiments, the liquid crystal component may further select from those of formula (II):

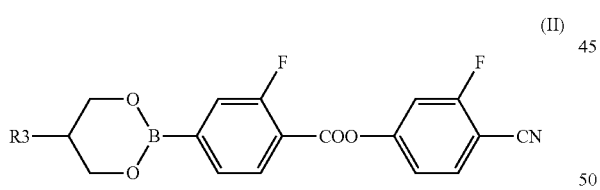

(II)

wherein R3 is selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups ($OCF_2$) and carbon trifluoride groups ($CF_3$), in which one or more $CH_2$ groups may be replaced by —O—, —S—, —COO—, —CO—, —OCO— or —O—COO—.

In some embodiments, the liquid crystal composition may further include a highly conjugated liquid crystal component is selected from

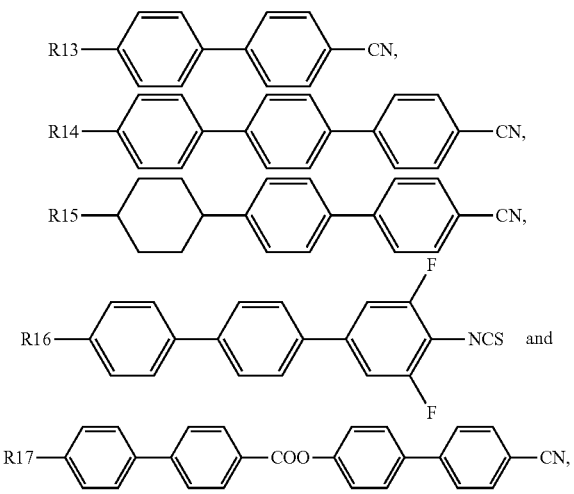

wherein R13 to R17 are selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups ($OCF_2$) and carbon trifluoride groups ($CF_3$), in which one or more $CH_2$ groups may be replaced by —O—, —S—, —COO—, —CO—, —OCO— or —O—COO—.

In some embodiments, the highly conjugated liquid crystal component may further select from

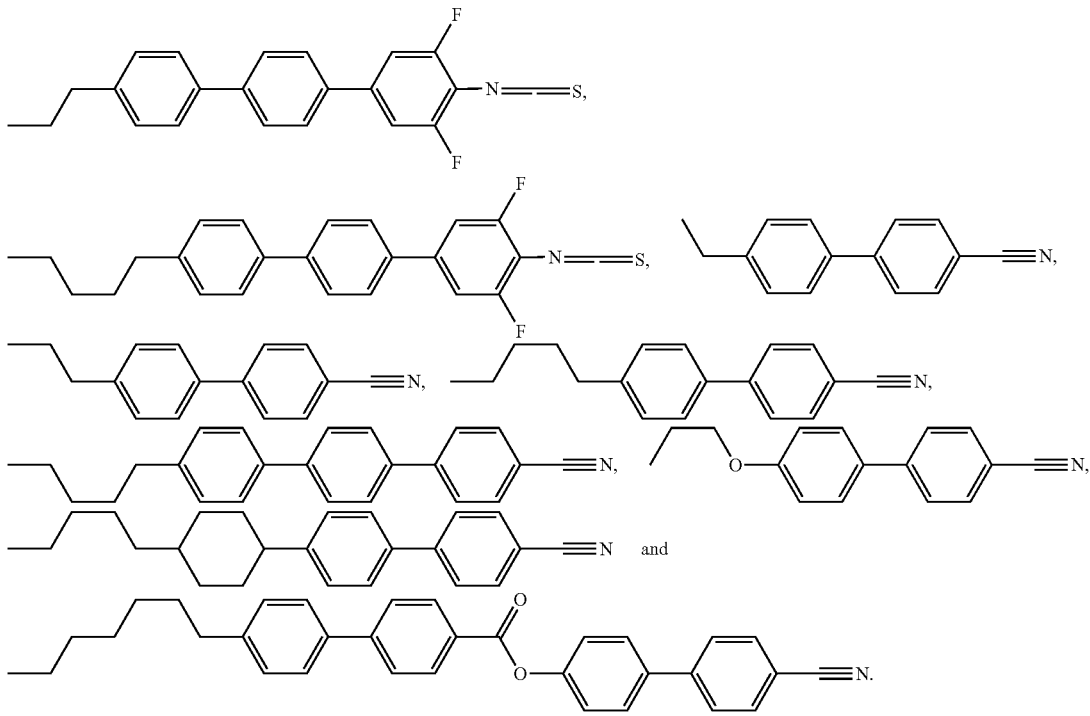

In some embodiments, the liquid crystal composition may further include a chiral dopant to induce a blue phase in the liquid crystal composition, wherein the chiral dopant is in an amount between approximately 4 weight % and approximately 35 weight % of the total weight of the liquid crystal composition.

In some embodiments, the liquid crystal component is used in a range of approximately 5% to 70% by weight of the total content of a liquid crystal composition used in a thin film transistor (TFT) based liquid crystal display.

In some embodiments, the liquid crystal component is structured as

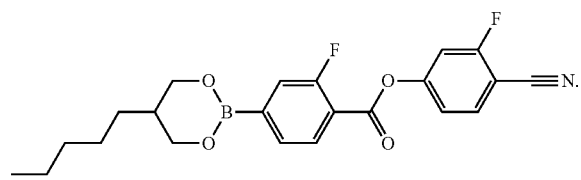 [SMILES: CCCCCC1COB(c2ccc(C(=O)Oc3ccc(C#N)c(F)c3)c(F)c2)OC1]

In general, in one aspect, a liquid crystal display includes a first substrate; a second substrate arranged opposite the first substrate; a liquid crystal layer sandwiched between the first and the second substrates; and plural pixel areas which are formed in the shape of a matrix, pixel electrodes, common electrodes are arranged in the pixel areas, wherein each of the electrodes has a electrode height greater than approximately 0.5 μm.

In some embodiments, the electrode height of the liquid crystal display is ranged of approximately 2 μm to approximately 4 μm. In some embodiments, a cell gap formed between the first and the second transparent substrates is ranged of approximately 1 μm to approximately 100 μm.

In some embodiments, each of the electrodes are formed in a trapezoidal shape with a bottom width ranged between approximately 2 μm to approximately 10 μm and a top width ranged between approximately 1 μm to approximately 5 μm.

In some embodiments, each of the electrodes are formed in a T shape with a bottom width ranged between approximately 2 μm to approximately 10 μm, a top width ranged between approximately 1 μm to approximately 5 μm, a first height ranged between approximately 0.5 μm to approximately 3 μm and a second height ranged between approximately 0.5 μm to approximately 3 μm.

In some embodiments, the pixel electrodes and the common electrodes are formed on same substrate.

In some embodiments, the pixel electrodes and the common electrodes are formed on different substrate.

In some embodiments, the shape of the electrodes is selected from a lengthwise strip shape, a V-shape, a zigzag shape and a comb-shape.

In some embodiments, the pixel electrodes and the common electrodes are formed on both the first substrate and the second substrate.

In some embodiments, the liquid crystal layer contains liquid crystal molecules, wherein at least one of the liquid crystal molecules is selected from those of formula (I):

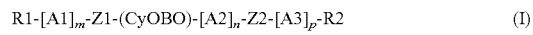

R1-[A1]$_m$-Z1-(CyOBO)-[A2]$_n$-Z2-[A3]$_p$-R2     (I)

wherein R1 and R2 may be the same or different, and R1 and R2 are selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF$_2$) and carbon trifluoride groups (CF$_3$), in which one or more CH$_2$ groups may be replaced by —O—, —S—, —COO—, —CO—, —OCO— or —O—COO—;

A1, A2, and A3 may be the same or different, and A1, A2, and A3 are selected from 1,4-cyclohexylene, 1,4-cyclohexenylene, 1,4-phenylene, 2,6-naphthalene, 2,6-tetrahydronaphthalene, 2,6-dihydronaphthalene, 4,4'-biphenylene, 2- or 3-fluoro, or 2,3-difluo-1,4-phenylene, 7-fluoro, 8-fluoro, 7,8-difluoro, 1,7,8-trifluoronaphthalene, 4'-[2',6',3,5-tetrafluoro]-4-biphenyl, 4'-[2',3,5-trifluoro]-4-biphenyl, 4'-[3,5-difluoro]-4-biphenyl, and 4'-[3-difluoro-]-4-biphenyl;

Z1 and Z2 may be the same or different, and Z1 and Z2 are selected from a single bond, —CH$_2$CH$_2$—, —CH═CH—, —C≡C—, —COO—, —CO—, —OCO— and —O—COO—; and m, n and p may be the same or different, and m, n and p are selected from 0, 1 or 2, in which at least one of m, n, and p should be ≧1.

In some embodiments, the liquid crystal layer contains liquid crystal molecules, wherein at least one of the liquid crystal molecules is selected from those of formula (II):

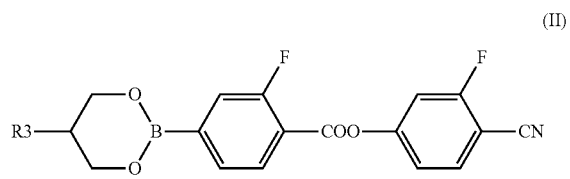

(II)

wherein R3 is selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF$_2$) and carbon trifluoride groups (CF$_3$), in which one or more CH$_2$ groups may be replaced by —O—, —S—, —COO—, —CO—, —OCO— or —O—COO—.

In general, in one aspect, a liquid crystal display includes a first substrate; a second substrate arranged opposite the first substrate; and a liquid crystal layer sandwiched between the first and the second substrates; wherein a first common electrode and a first pixel electrode formed over the first substrate with a first insulating layer therebetween; wherein a second common electrode and a second pixel electrode formed over the second substrate with a second insulating layer therebetween.

Further objects and advantages of this invention will be apparent from the following detailed description of preferred embodiments which are illustrated schematically in the accompanying drawings.

DETAILED DESCRIPTION OF THE EMBODIMENTS

Figure 1:
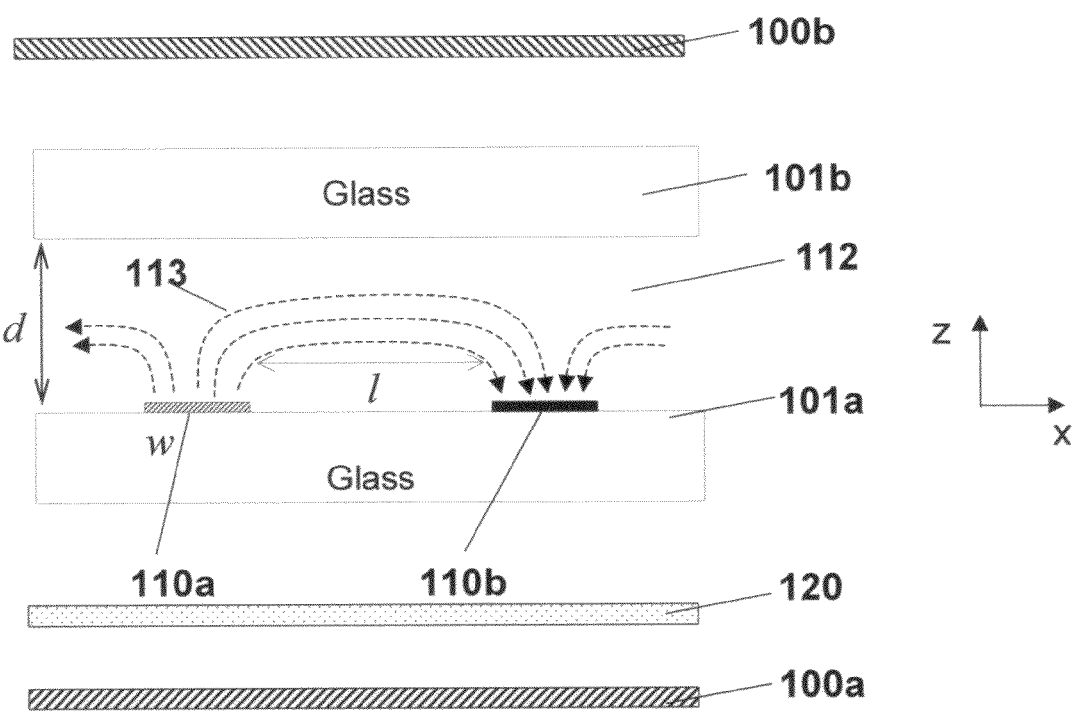
FIG. 1 is a cross-sectional view of an example blue phase liquid crystal cell.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following abbreviations and acronyms are listed below to facilitate the explanation of the description of the present invention.

BPLCD is used herein to mean "blue phase liquid crystal display"

CB15 is a chiral dopant material, S-4'-(2-methylbutyl)-4-cyanobiphenyl, commercially available from Merck & Co., Inc.

CF$_3$ is the chemical symbol for "carbon trifluoride"

Cl is the chemical symbol for "chlorine"

CN is used herein to represent the "cyano group"

CyOBO is a liquid crystalline heterocyclic boron compound wherein Cy is commonly used to abbreviate cyclohexane in liquid crystal patents and represents a trans-1,4 disubstituted cyclohexayl ring as disclosed in U.S. Pat. Nos. 4,632,515; 4,704,227; 4,751,017; 4,812,258 and 4,820,839. OBO is a 1,3,2-dioxaborinane-2,5-diyl group with liquid crystal properties. More specifically, the formula for CyOBO in Formula I of the present invention is represented structurally in Formula II:

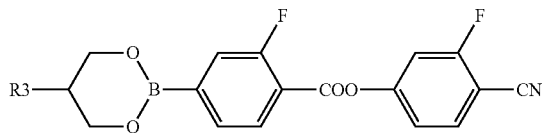

wherein the structure

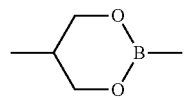

is written —(CyOBO)— and is a 1,4 cyclohexyl ring substituted with a 1,3,2-dioxaborinane-2,5 diyl group.

Darocur 1173 is a liquid photoinitiator, 2-Hydroxy-2-methyl-1-phenyl-propan-1-one, commercially available from Ciba Specialty Chemicals, Inc. Darocur is a registered trademark of Ciba.

EHA is used herein to mean "ethyl hexyl acrylate," a reactive diluent

F is the chemical symbol for "fluorine"

IPS used herein means "in-plane switching"

ITO is used herein to mean "indium tin oxide"

LC is used herein to mean "liquid crystal"

LCD is used herein to mean "liquid crystal display"

MVA is used to mean multi-domain vertical alignment

NCS is used herein to represent the isothiocyanate group

O is the chemical symbol for "oxygen"

$OCF_2$ is used herein to mean an alkoxyfluoroakyl radical

OCB used herein means "optically compensated bend"

RM257 is a reactive liquid crystalline diacrylate monomer commercially available from Merck, S is the chemical symbol for "sulfur"

STN is used herein to mean "super-twisted nematic"

TFT used herein means "Thin film transistor"

V-T is used herein to mean "voltage—transmittance"

ZLI-4571 (Merck) is a chiral dopant compound commercially available from Merck.

The liquid crystal composition according to an embodiment of the present invention includes several kinds of liquid crystal compounds that differ from each other by their molecular structure and therefore by physical characteristics. A liquid crystal compound may include a core group making a central axis and a terminal group and/or a lateral group connected to the core group. The core group may include at least one of cyclic groups selected from a phenyl group, a cyclohexyl group, and heterocycles. The terminal group and/or lateral group may include a non-polar group such as an alkyl group, an alkoxy group, and an alkenyl group, and a polar group including fluorine atom (F) and chlorine atom (Cl) and CN, NCS, $OCF_2$, and $CF_3$ groups. Linking a proper molecular core and terminal group leads to a significant increase of optical anisotropy through elongated π-electron conjugation along the principal molecular axis.

A typical drawback is the severely increased melting point temperature and most often heat fusion enthalpy of melting. Melting properties can be improved by proper lateral substitutions which play a crucial role to the dielectric anisotropy of some single liquid crystal compounds. By positioning local dipoles into an average molecular dipole moment, the lateral substitution together with a terminal moiety effectively defines dielectric properties of the single components and therefore liquid crystal mixtures. Therefore, provided in the present invention the selection of single component structures leads to a claimed formulation, which exhibits high optical and dielectric anisotropies to improve operating voltage and light efficiency of the blue phase liquid crystal composites for display applications. The present invention provides a liquid crystal composition and a liquid crystal display having the same with a wide operational temperature range and low threshold and operating voltages. According to an embodiment of present invention, the liquid crystal composition includes at least two classes. The first class includes a highly polar liquid crystal compound and the second one includes a polar liquid crystal highly conjugated liquid crystal compound. The first class includes a liquid crystal represented by Chemical Formula (I):

$$R1-[A1]_n-Z1-(CyOBO)-[A2]_n-Z2-[A3]_p-R2 \qquad (I)$$

where R1 and R2 are each, independently one of another, H, an alkyl or alkenyl radical having up to 10 carbon atoms which is unsubstituted, monosubstituted by CN, NCS, $CF_3$ or monosubstituted by halogen, where one or more $CH_2$ groups may also, in each case independently of one another, be replaced by —O—, —S—, —COO—, —CO—, —OCO— or —O—COO— in such way that oxygen atoms are not linked directly to one another.

A1, A2, and A3 are selected from at least one of the compounds: 1,4-cyclohexylene, 1,4-cyclohexenylene, 1,4-phenylene, 2,6-naphthalene, 2,6-tetrahydronaphtalene, 2,6-dihydronaphthalene, 4,4'-biphenylene, 2- or 3-fluoro, or 2,3-difluo-1,4-phenylene, 7-fluoro, 8-fluoro, 7,8-difluoro, 1,7,8-trifluoronaphthalene, 4'-[2',6',3,5-tetrafluoro]-4-biphenyl, 4'-[2',3,5-trifluoro]-4-biphenyl, 4'-[3,5-difluoro]-4-biphenyl, 4'-[3-difluoro]-4-biphenyl, and A1, A2 and A3 may be independent of one another or same with each other. The value of m, n and p are each, independently one of another 0, 1 or 2, wherein at least one of m, n and p is equal to or greater than 1.

Z1 and Z2 are each, independently of one another, a single bond, —$CH_2CH_2$—, —CH=CH—, —C≡C—, —COO—, —CO—, —OCO— or —O—COO— in such way that oxygen atoms are not linked directly to one another. Because of 5,2[1,3-dioxa]-2-borinane moiety, compounds of Chemical Formula (I) poses remarkably high dielectric anisotropy of approximately +90 while viscosity is not dramatically high. The dielectric anisotropy of Chemical Formula (I) can be further extended by implementation of ester group (—COO—) and lateral fluorination. The value of dielectric anisotropy will have direct impact on threshold voltage. Depends on A and Z constituents, component of Chemical Formula (I) may also exhibit relatively high birefringence of approximately 0.3 by including biphenyl or terphenyl as a combination of A1, A2 and A3. These components maintain relatively good mesomorphic properties, and therefore demonstrate excellent miscibility with other LC components. Thus, it can be used in the mixtures without raising a concern of mixture thermodynamic stability. The liquid crystal compound represented by Chemical Formula (I) includes at less than approximately 70% by weight of the total content of the liquid crystal composition in one example.

The liquid crystal compound represented by Chemical Formula (I) may be represented by Chemical Formula (II):

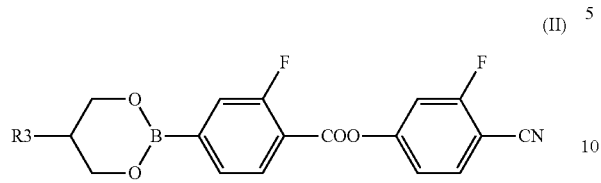
(II)

where R3 is selected from one of H, an alkyl or alkenyl radical having up to 10 carbon atoms. While R3 is selected from an alkyl or alkenyl radical having 1 to 10 carbon atoms, R3 maybe unsubstituted, monosubstituted by CN, NCS, $CF_3$ or monosubstituted by halogen, wherein one or more $CH_2$ groups of alkyl or alkenyl radical may also be replaced by at least one of these structures:

—O—, —S—, —COO—, —CO—, —OCO— or —O—COO—.

The first class may also include at least one of the liquid crystal compounds represented by the Chemical Formulas (III)-(XI):

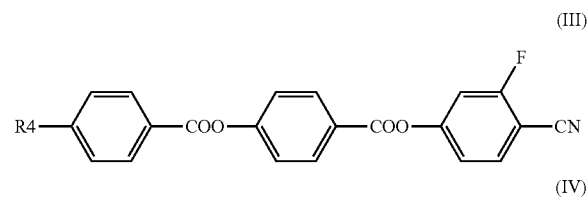
(III)

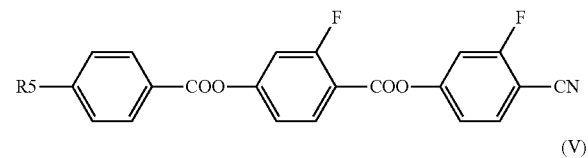
(IV)

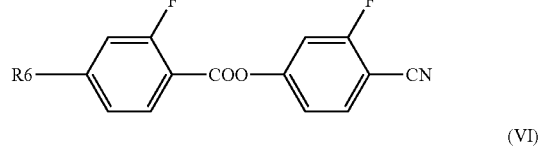
(V)

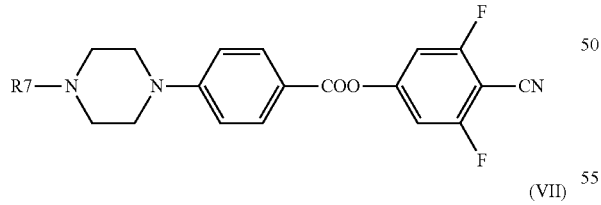
(VI)

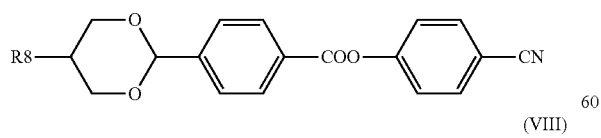
(VII)

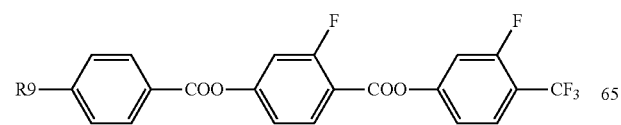
(VIII)

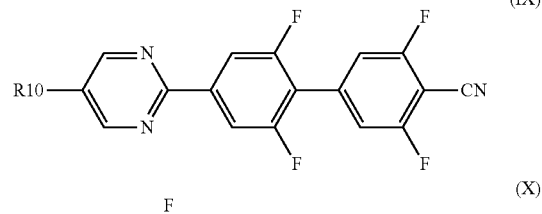
(IX)

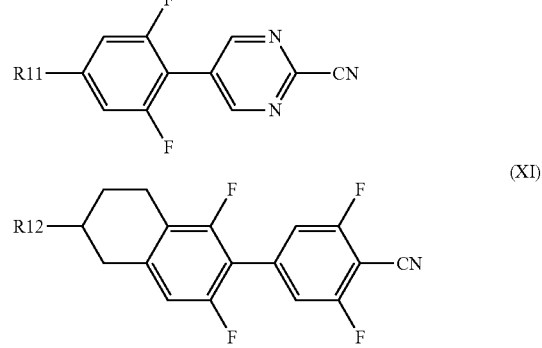
(X)
(XI)

wherein each of R4 to R12 may be independent of one another, H, an alkyl or alkenyl radical having 1 to 10 carbon atoms. While R4 to R12 is selected from an alkyl or alkenyl radical having 1 to 10 carbon atoms, R4 to R12 can be unsubstituted, monosubstituted by CN, NCS, $CF_3$ or monosubstituted by halogen, wherein one or more $CH_2$ groups of alkyl or alkenyl radical may also be replaced by at least one of these structures: —O—, —S—, —COO—, —CO—, —OCO— or —O—COO—. Polar terminal cyano (CN) group can be replaced with isothiocyanate moiety (NCS) to extend conjugation and therefore birefringence of Chemical Structures (III)-(XI).

The existence of Chemical Formula (I), represented specifically by Chemical Formula (II), eliminates the need for a large amount of ester and double ester components (such as Chemical Formulas (III)-(VIII) in the formulation and therefore mixture's rotational viscosity remains relatively low. The ratio between Chemical Formula (I) (represented specifically by Chemical Formula (II)) and Chemical Formulas (VIII)-(XVI) is within the range of approximately 5% to approximately 70% by weight. Specifically in presented example it is approximately 34% by weight.

The second class may further include at least one of the liquid crystal compounds represented by the Chemical Formulas (XII)-(XVI):

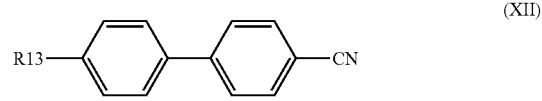
(XII)

(XIII)

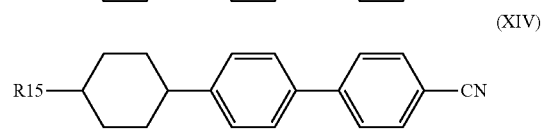
(XIV)

-continued

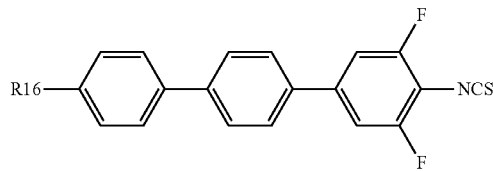
(XV)

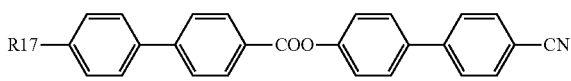
(XVI)

Wherein each of R13 to R17 may be independently one another, H, an alkyl or alkenyl radical having 1 to 10 carbon atoms. While R13 to R17 is selected from an alkyl or alkenyl radical having 1 to 10 carbon atoms, R13 to R17 maybe unsubstituted, monosubstituted by CN, NCS, $CF_3$ or monosubstituted by halogen, wherein one or more $CH_2$ groups of alkyl or alkenyl radical may also be replaced by at least one of these structures: —O—, —S—, —COO—, —CO—, —OCO— or —O—COO—.

The first class of the liquid crystal component may be included at approximately 5% to approximately 70 wt % of the total liquid crystal composition. The second class component may be included at approximately 5% to approximately 70% of the total liquid crystal composition.

The properties of a liquid crystal composition can be adjusted by designing the structure and the amount of the liquid crystal compounds. The liquid crystal composition, for example, may have a liquid crystal phase within a temperature range of approximately −40 to 110° C. in one example. The blue phase exist for about 3-4 degrees below clearing point temperature. The liquid crystal composition may have optical anisotropy of about 0.15 to 0.32, and dielectric anisotropy of +10 to +32 in one example. In another example, the liquid crystal composition's clearing point may be as high as approximately 105° C. with undetectable transition to crystal or glass state at the temperatures below approximately −20° C.

Additional chiral agent may induce a blue phase in the formulation. Known and suitable materials are optically active medium like: ZLI-4571 (Merck) or CB15 (Merck). The type and amount of chiral agent defines the pitch length but also may have improvement on overall physical properties of the whole formulation.

However, if the concentration of the chiral agent is lower than a certain number, Blue phase is not formed and consequently color is observed. If the concentration of the chiral agent is higher than a certain number, such as 35%, the blue phase is formed but lower clearing point temperature and/or chiral agent precipitation make the composition useless.

Besides, the amount of chiral dopant depends on their helical twisting power. A condition is to shift Bragg reflection of the LC to lower than $\lambda=400$ nm. This will result in colorless blue phase. The increase of chiral dopant will shift Bragg reflection toward the shorter wavelength. Therefore, in order to eliminate coloration, chiral dopant should be in the amount sufficient to assure Bragg reflection happened at the wavelength lower than blue color of a display. In the present invention, the amount of chiral dopant is about between approximately 4% and approximately 35% by weight of the liquid crystal composition.

With the liquid crystal display device of the invention, it is to apply a polymer stabilized method to the liquid crystal cell. The way to apply a polymer stabilized method to the liquid crystal cell is to put a non-liquid crystal monomer with a liquid crystalline monomer into the liquid crystal composition. After a UV irradiation process, the liquid crystal cell contains a polymer network structure. A polymer stabilized method is necessary to extend the temperature range of blue phase of the liquid crystal composition. Response time will also be improved by the polymer stabilized method. The application of polymer stabilized method to the liquid crystal composition will not affect the other physical properties of the liquid crystal composition.

Table 1 shows one example of the liquid crystal composition. The liquid crystal composition is designed to show maximum Kerr effect. The liquid crystal phase of this liquid crystal composition shows at approximately −40° C. to approximately 106° C.

TABLE 1

| liquid crystal componand | wt % | Mixture Properties at approximately 20° C., 633 nm, 1 kHz | |
|---|---|---|---|
| C3PhCOOPh(F)COOPh(F)—CN | 5 | $V_{th}$ | 0.59 [V] |
| | | $\epsilon_{//}$ | +37.8 |
| | | $\epsilon_{\perp}$ | +5.7 |
| | | $\Delta\epsilon$ | +32.1 |
| | | $K_{11}$ | 6.4 [pN] |
| | | $K_{22}$ | 3.7 [pN] |
| | | $K_{33}$ | 7.3 [pN] |
| | | $\Delta n$ | 0.3040 |
| | | $\gamma_1/K_{11}$ | 83.1 |

TABLE 1-continued
| liquid crystal componand | wt % | Mixture Properties at approximately 20° C., 633 nm, 1 kHz |
|---|---|---|
| 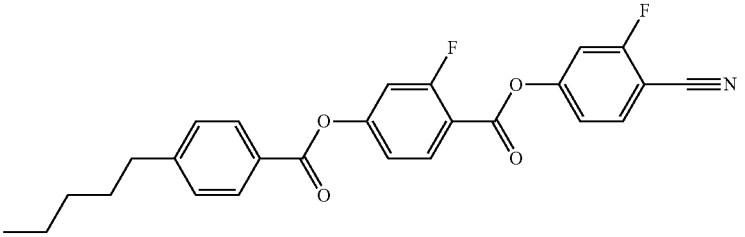<br>C5PhCOOPh(F)COOPh(F)—CN | 6 | |
| 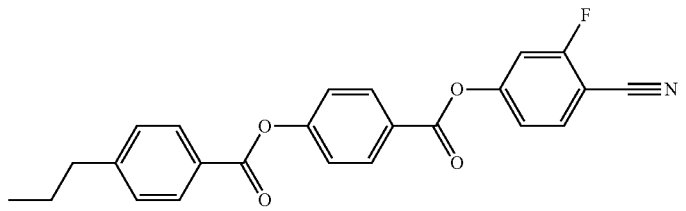<br>C3PhCOOPhCOOPh(3F)—CN | 4 | |
| 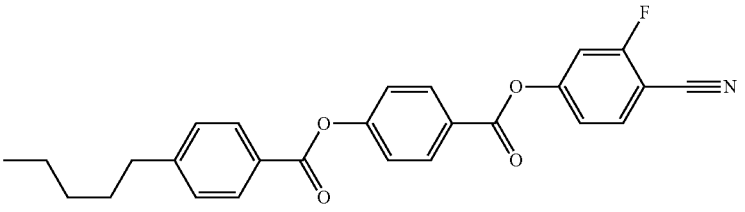<br>C5PhCOOPhCOOPh(3F)—CN | 5 | |
| 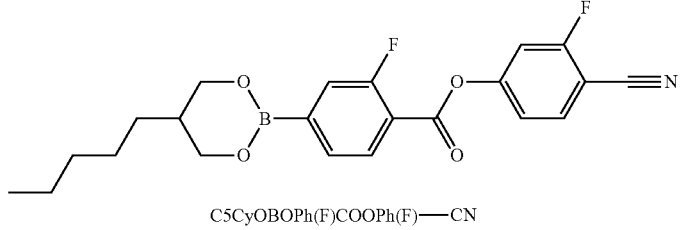<br>C5CyOBOPh(F)COOPh(F)—CN | 11 | |
| 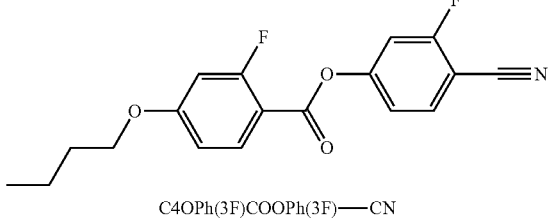<br>C4OPh(3F)COOPh(3F)—CN | 1 | |
| 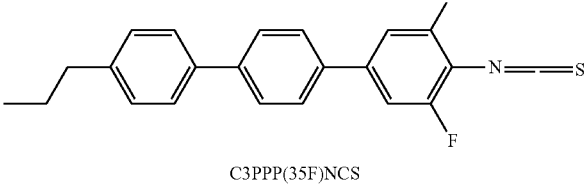<br>C3PPP(35F)NCS | 17 | |

TABLE 1-continued

| liquid crystal componand | wt % | Mixture Properties at approximately 20° C., 633 nm, 1 kHz |
|---|---|---|
| C5PPP(35F)NCS | 22 | |
| C2PPCN | 4 | |
| C3PPCN | 2 | |
| C5PPCN | 11 | |
| C5PPPCN | 3 | |
| C3OPPCN | 3 | |
| C5CPPCN | 4 | |
| C7PPCOOPPCN | 2 | |

Wherein C3PhCOOPh(F)COOPh(F)—CN, C5PhCOOPh(F)COOPh(F)—CN, C3PhCOOPhCOOPh(3F)—CN, C5PhCOOPhCOOPh(3F)—CN, C5CyOBOPh(F)COOPh(F)—CN and C4OPh(3F)COOPh(3F)—CN were classed in the first class; C3PPP(35F)NCS, C5PPP(35F)NCS, C2PPCN, C3PPCN, C5PPCN, C5PPPCN, C3OPPCN, C5CPPCN, C5CyOBOPh(F)COOPh(F)—CN and C7PPCOOPPCN were classed in the second class; Wherein C5CyOBOPh(F)COOPh(F)—CN was one example of Chemical Formula (I), specially Chemical Formula (II).

The liquid crystal mixture may be blended with the mentioned chiral agents to form a chiral liquid crystal mixture. The amount of the chiral agents is about between 4% and 35 wt %, for example, within approximately 15% to approximately 30%. The ratio CB15/ZLI4572 is about between approximately 30% to approximately 80% wt, for example, approximately 50% to approximately 70% wt.

The blue phase structure of this chiral liquid crystal mixture exists at temperature within 101° C. to approximately 105° C. (N*-BP transition occurs at approximately 101° C. and BP-Iso at approximately 105° C.).

In order to stabilize blue phase structure a liquidcrystalline monomer RM257 and an acrylate monomer EHA are used together with a colorless photo initiator Darocur 1173. The wavelength used in the present invention is about 365 nm. UV intensity should be in the range of approximately 0.1 mW/cm$^2$ to approximately 1.0 W/cm$^2$ with a constant temperature. Various concentration and ratio of RM257 and EHA influence the performance of blue phase based device. Therefore, for fast operation concentration of the monomer is in the range of approximately 25 wt % to approximately 50 wt % with the molar ratio of EHA/RM257 at the range of approximately 6/4 to approximately 8/2. A LC-polymer complex shows extended blue phase existence temperature from approximately −40° C. to approximately 110° C.

The structure of RM257, EHA and Darocur 1173 shows as below.

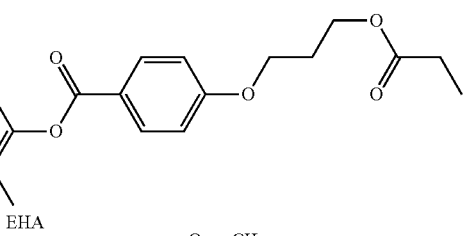

RM257

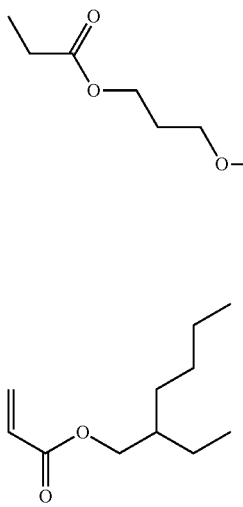

EHA

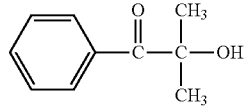

Darocur 1173

The following is a list of the reference numbers used in the drawings and the detailed specification to identify components:

| | | | |
|---|---|---|---|
| 100a | polarizer | 110a | patterned pixel electrode |
| 100b | polarizer | 110b | patterned common electrode |
| 101a | transparent substrate | 114a | passivation layer |
| 101b | transparent substrate | 120 | retardation film |
| 200a | crossed polarizer | 700a | linear polarizer |
| 200b | crossed polarizer | 700b | linear polarizer |
| 201a | glass substrate | 701a | glass substrate |
| 201b | glass substrate | 701b | glass substrate |
| 210a | patterned pixel electrode | 710a | pixel electrode |
| 210b | patterned common electrode | 710b | common electrode |
| 212 | BPLC layer | 720a | pixel electrodes |
| 220 | retardation film | 720b | common electrodes |
| 401a | bottom substrate | 735 | electric potential lines |
| 512 | BPLC layer | 740 | biaxial film |
| 500a | crossed polarizer | 750 | BPLC cell |
| 500b | cross polarizer | 760 | curve |
| 501a | glass substrate | 762 | curve |
| 501b | glass substrate | 801a | bottom substrate |
| 510a | pixel electrode | 801b | top substrate |
| 510b | common electrode | 810a | pixel electrode |
| 520 | retardation film | 810b | common electrode |
| 513 | electric fields | 820a | pixel electrode |
| 514a | passivation layer | 820b | common electrode |
| 514 | passivation layer | 830 | dashed arrows |
| 515a | conductive layer | 860 | VT curve |
| 515b | conductive layer | 900a | bottom linear polarizer |
| 520 | retardation film | 900b | top linear polarizer |
| 525 | electric potential lines | 901a | bottom glass substrate |
| 901b | bottom glass substrate | 1001a | top substrate |
| 910a | T-Shaped pixel electrode | 1002b | bottom substrate |
| 910b | common electrode | 1010a | T shaped pixel electrode |
| 912 | BPLC cell | 1010b | Common electrode |
| 920 | Compensation film | 1013 | dashed arrows |
| 925 | electric potential lines | 1020a | T shaped pixel electrode |
| 1012 | BPLC Cell | 1020b | Common electrode |
| 1000a | bottom linear polarizer | 1030 | compensation film |
| 1000b | top linear polarizer | | |

In one of the embodiments of the blue phase liquid crystal display BPLCD device, the schematic view of one repetitive period of the LC cell configuration is shown in the FIG. 1. The BPLC layer 112 is interposed between two glass substrates, a bottom substrate 101a and a top substrate 101b, which is further sandwiched between two crossed polarizers 100a and 100b. A patterned pixel electrode 110a is formed on the inner surface of the bottom substrate 101a and a patterned common electrode 110b is formed on the same bottom substrate 101a in this embodiment. These electrodes are further controlled by the driving TFT and switch unit (not shown). The blue phase LCD device is performing display operation by generating an electric field 113 between the f patterned pixel electrode 110a and the patterned common electrode 110b. A retardation film 120, such as a biaxial film or uniaxial film, is laminated between the bottom polarizer 100a and the top polarizer 100b to expand the viewing angle of the display.

As shown, w is the electrode width, l is the electrode gap, and d is the cell gap. The value of w is about 10 um, the value of l is about 10 μm and the value of d is about 25 μm in one example.

Microphotography images were obtained from an FFS electro-optical cell filled with mixture of the present invention. No alignment layers were used in the cell and the cell was operated at a slightly elevated temperature of 35° C. and stepwise voltage (e.g. 0V, 10V, 15V . . . 60V), and crossed-polarizers condition. As the applied voltage increased, the transmittance increases.

Figure 2:
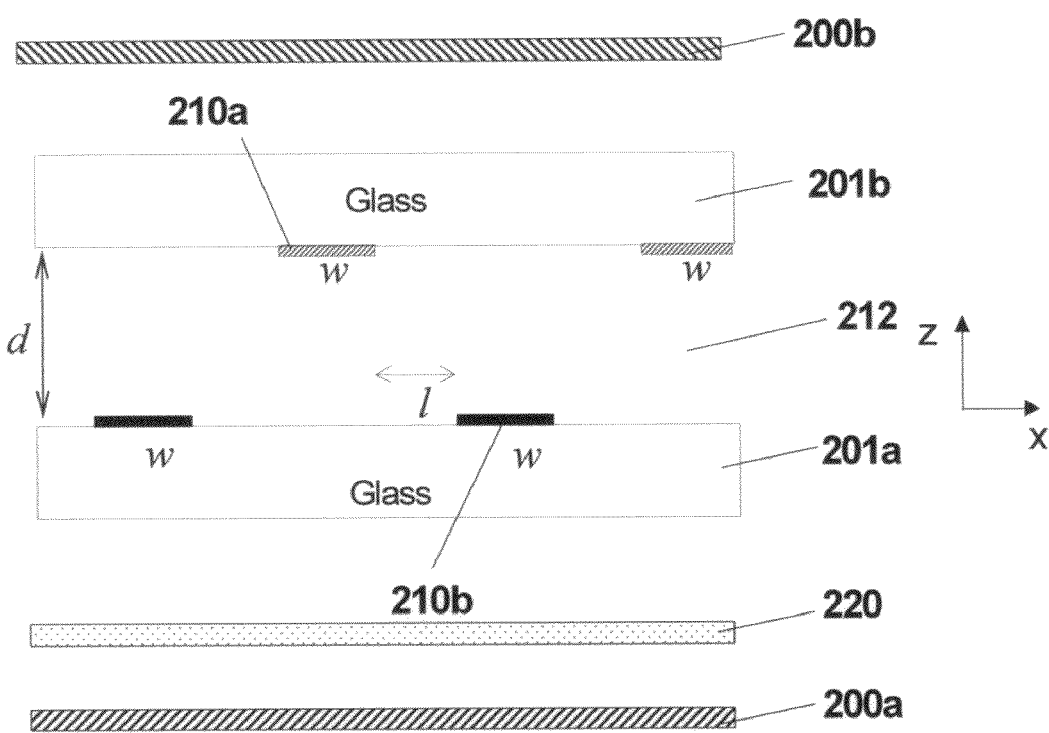
FIG. 2 is a cross-sectional view of another example blue phase liquid crystal cell.

In order to enhance the transmittance and to reduce the operating voltage and the response time, the reductance of the electrode width or spacing and the enlargement of the cell gap can be applied. The electrode width can be approximately 100 nm to approximately 10 μm and the ratio between the electrode spacing and the electrode width (l/w) can be approximately 0.1 to approximately 10. The gap range can be from approximately 1 μm to approximately 100 μm. The value of w is about 10 μm, the value of l is about 10 μm and the value of d is about 25 μm in one example. In another example, the pixel electrode and the common electrode formed on different substrate as shown in FIG. 2.

In this embodiment, the blue phase LC layer 212 is interposed between two glass substrates 201a and 201b, which is further sandwiched between two crossed polarizers 200a and 200b; a patterned pixel electrode 210a is formed on the inner surface of the substrate 201a; a patterned common electrode 210b is formed on the other substrate 201b, wherein these electrodes are further controlled by the driving TFT and switch unit (not shown); the blue phase LCD device is performing display operation by generating an electric field between the f patterned pixel electrode 210a and the patterned common electrode 210b. A retardation film 220, such as a biaxial film or uniaxial film, is laminated between the bottom polarizer 200a and the top polarizer 200b to expand the viewing angle of the display.

As shown, w is the electrode width, l is the electrode gap, and d is the cell gap. The value of w is about 5 μm, the value of l is about 5 μm and the value of d is about 10 μm in one example.

Figure 3A:
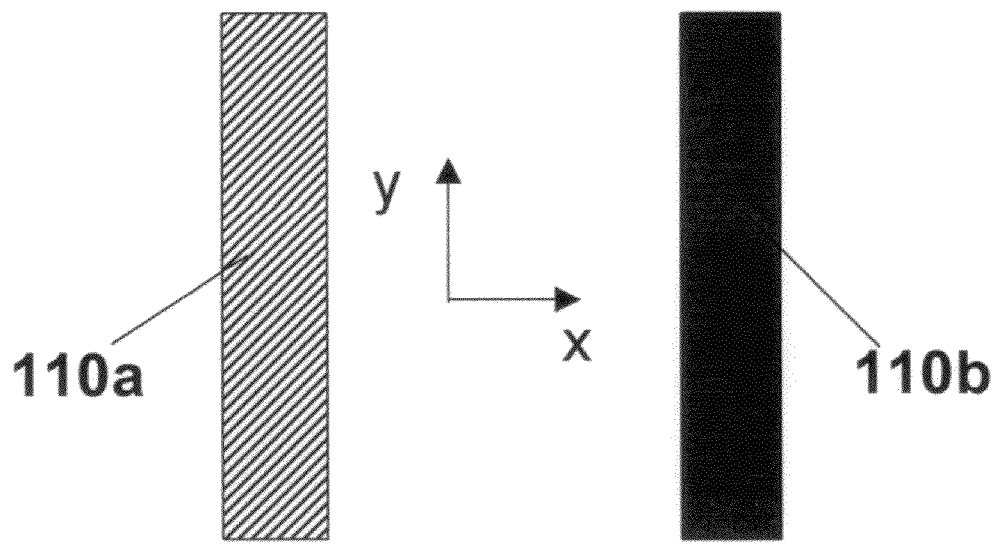
FIGS. 3A, 3B, and 3C are top views of example electrode structure.
Figure 3B:
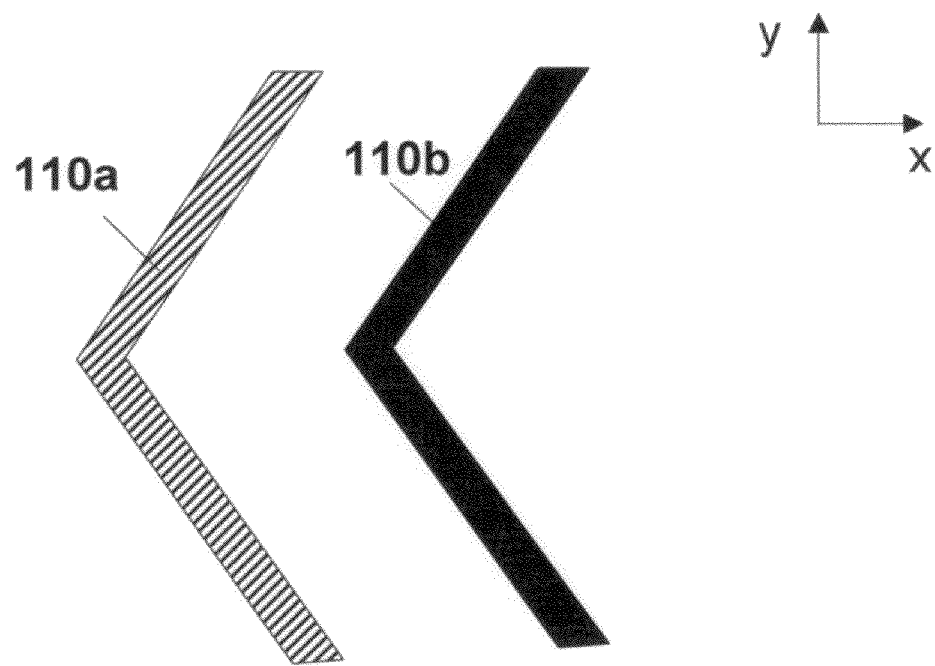
Figure 3C:
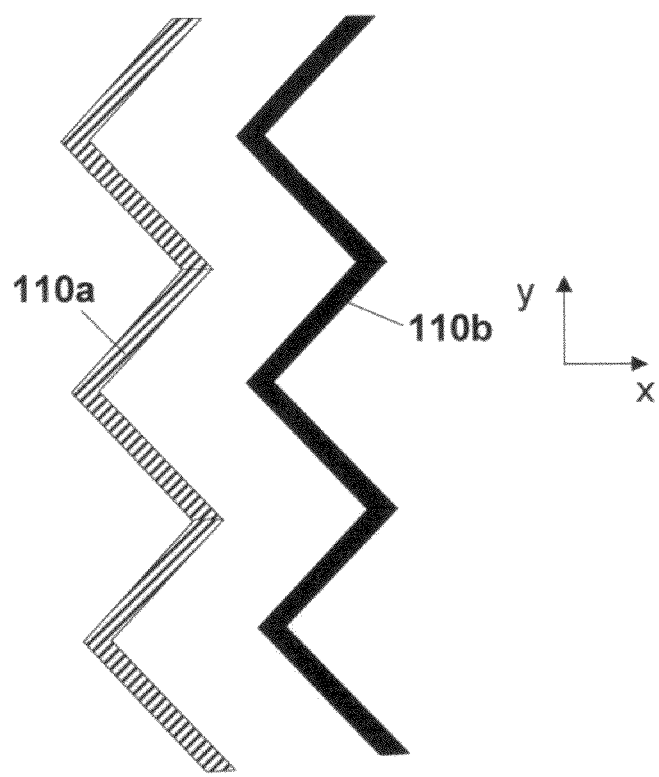

A top view of the electrodes is shown in FIG. 3A with lengthwise direction along the y-axis in the x-y plane. Alternatively, the electrodes can be in a chevron or V-shaped or can be zigzag shape in the x-y plane as shown in FIG. 3B and FIG. 3C, respectively, to further expand the viewing angle symmetry. The patterned pixel electrode 110a and the patterned common electrode 110b may be formed on the same substrate as shown in FIG. 1 or can be formed on opposite substrates as shown in FIG. 2.

Figure 4:
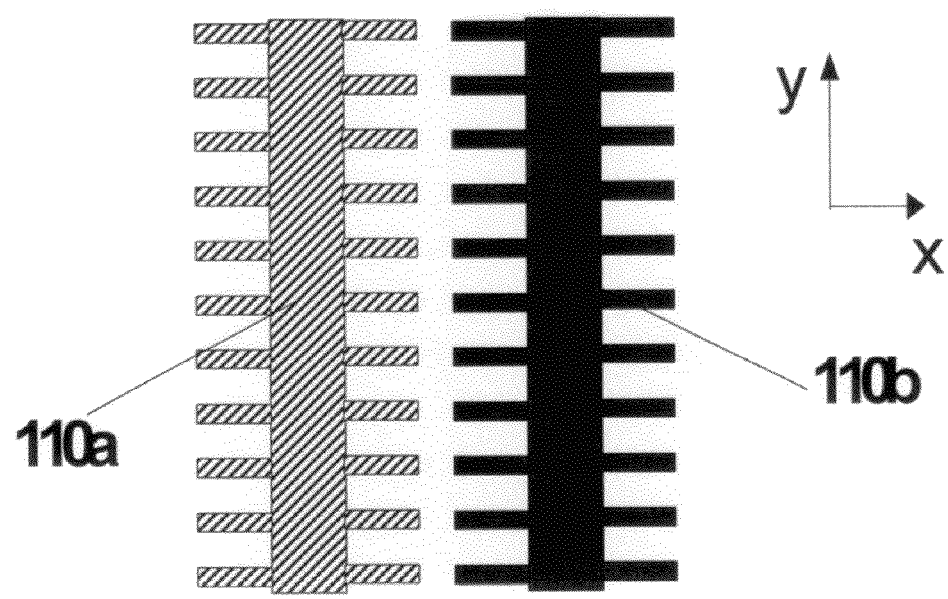
FIG. 4 is a top view of example electrode structure.

To enhance the electric fringe field, a fine slit structure can be used together with main slit structure such as shown in FIG. 4 together with one of the electrode structures shown in FIG. 3A, FIG. 3B or FIG. 3C. The patterned pixel electrode 110a and the patterned common electrode 110b may be formed on the same substrate as shown in FIG. 1 or can be formed on opposite substrates as shown in FIG. 2.

According to another embodiment of the present invention, the method to make a polymer stabilized blue phase liquid crystal cell includes the step of:
A. Provide a liquid crystal composition wherein one of liquid crystal composition of the liquid crystal composition with the structure of Chemical Formula (I)
B. Mixing the liquid crystal composition together with at least a chiral agent to form a chiral liquid crystal mixture.
C. After checking the blue phase existed temperature of the chiral liquid crystal mixture, a liquid crystal composite is formed by blending the chiral liquid crystal mixture together with a liquid crystalline monomer and a acrylate monomer (There are several ways used to check the blue phase existed temperature, ex, the using of a spectrometry or a polarizing microscopy.);
D. Heat the liquid crystal composite to it's clearing point;
E. Fill the liquid crystal composite into a cell;
F. After reducing the temperature to the blue phase existed temperature, keep this temperature and apply a UV irradiation process.
G. A polymer stabilized blue phase liquid crystal cell is formed after the UV irradiation process.

The driving voltage of a blue phase liquid crystal display device can be reduced by designing the shape of the electrodes.

Figure 5A:
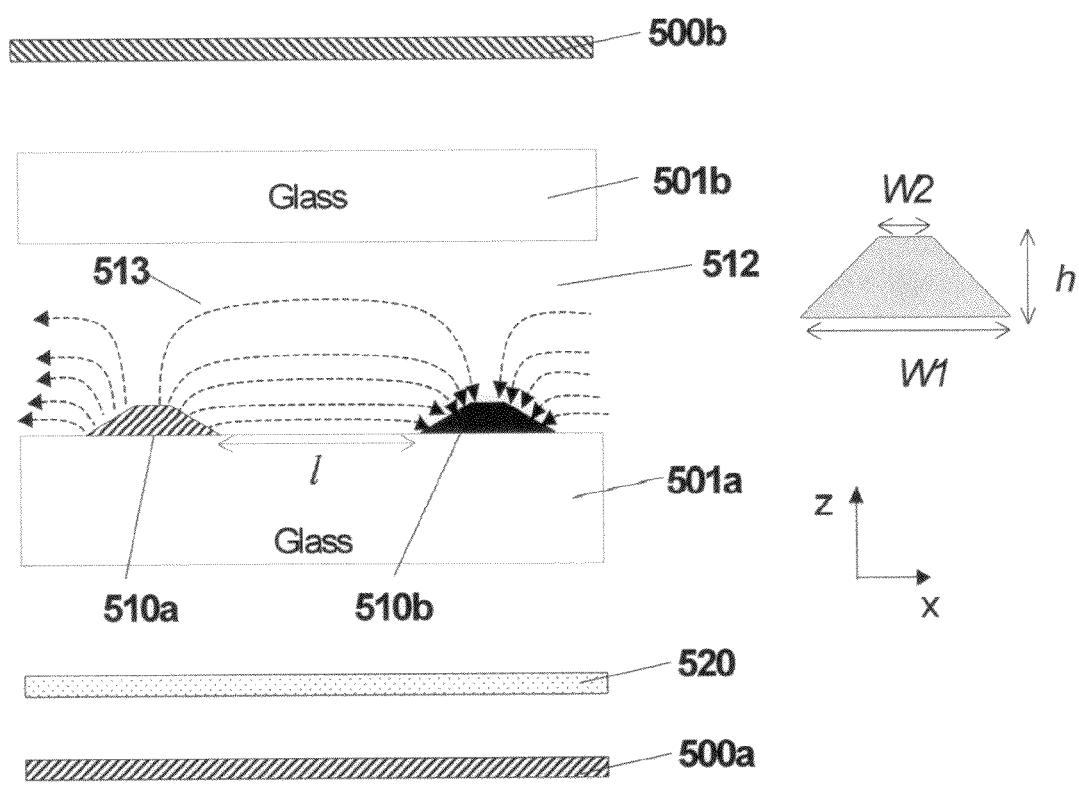
FIG. 5A is a cross-sectional view of an example blue phase liquid crystal cell.

In one of the embodiments of the blue phase LCD device, the schematic view of one repetitive period of the LC cell configuration is shown in the FIG. 5A.

Figure 5B:
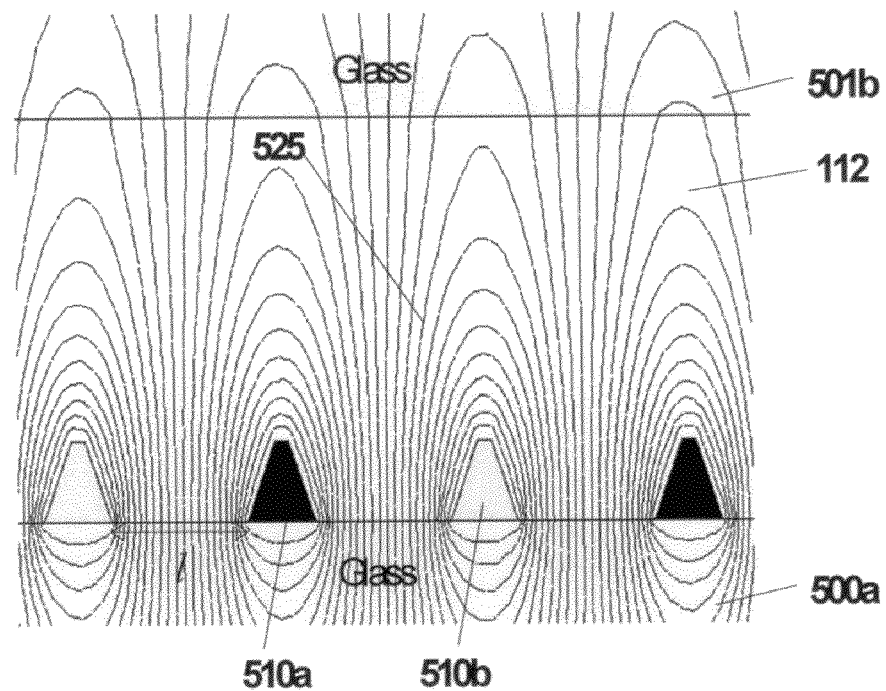
FIG. 5B is a schematic electric potential distribution diagram of the electrode structure shown in FIG. 5A.

The BPLC layer 512 is interposed between two glass substrates 501a and 501b, which is further sandwiched between two crossed polarizers 500a and 500b; a patterned pixel electrode 510a is formed on the inner surface of the bottom substrate 501a; a patterned common electrode 510b is formed on the same substrate 501a. These electrodes are further controlled by the driving TFT and switch unit (not shown). A retardation film 520, such as a biaxial film or uniaxial film, is laminated between the bottom polarizer 500a and the top polarizer 500b to expand the viewing angle of the display. Here the driving electrodes are no longer thin thickness rectangular stripes, instead they are formed in the shape of trapezoid with a substantial electrode height h as shown in the FIG. 5A. The dimension definition of the trapezoid electrode includes the electrode bottom width w1, and the top width w2 is less than the bottom width, the height of the trapezoid electrode is h, and the spacing distance between two adjacent electrodes is l. In this design configuration, the height h is substantially thick such as approximately 1 μm to approximately 3 μm, thus a substantial strong electric fields 513 generated from the pixel electrode 510a and the common electrode 510b can penetrate deeper into the LC bulk region. Since these electric fields are more distributed into the LC bulk region, the required driving voltage to attain adequate phase retardations for high light transmittance can be reduced. Regardless of the irregular electrode shape, the BPLCs appear isotropic when no voltage is applied, thus such irregular shapes will not affect the dark state of the device. The electrodes 510a and 510b can be made of full metal such as aluminum or transparent ITO material. In FIG. 5B, when voltage is on, the electric potential lines 525 can be generated from the electrodes, and as shown, rich fields penetrate into the bulk LC cell region.

Figure 5C:
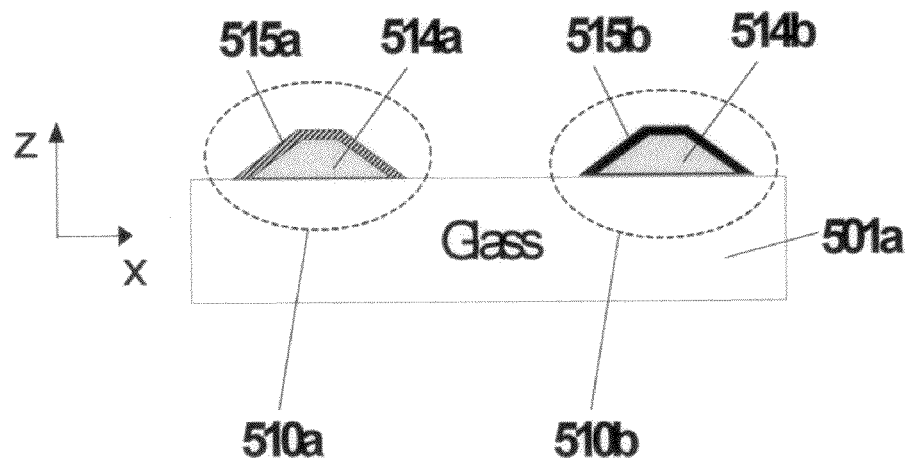
FIG. 5C is a cross-sectional view of an example of adjacent pixel and common electrodes.
Figure 5D:
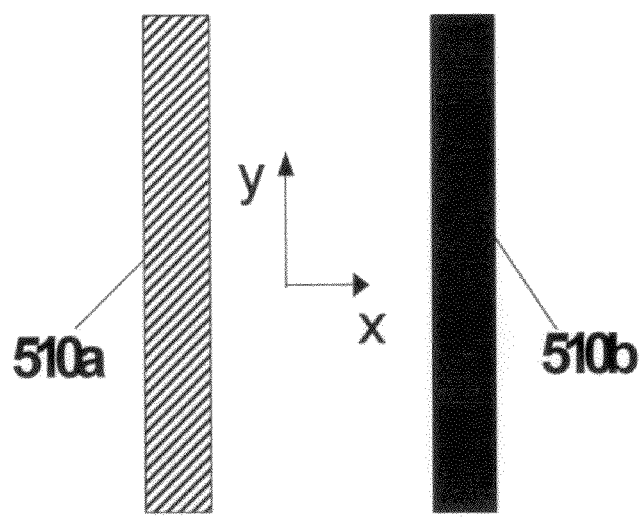
FIG. 5D is a top view of example electrode structure.
Figure 5E:
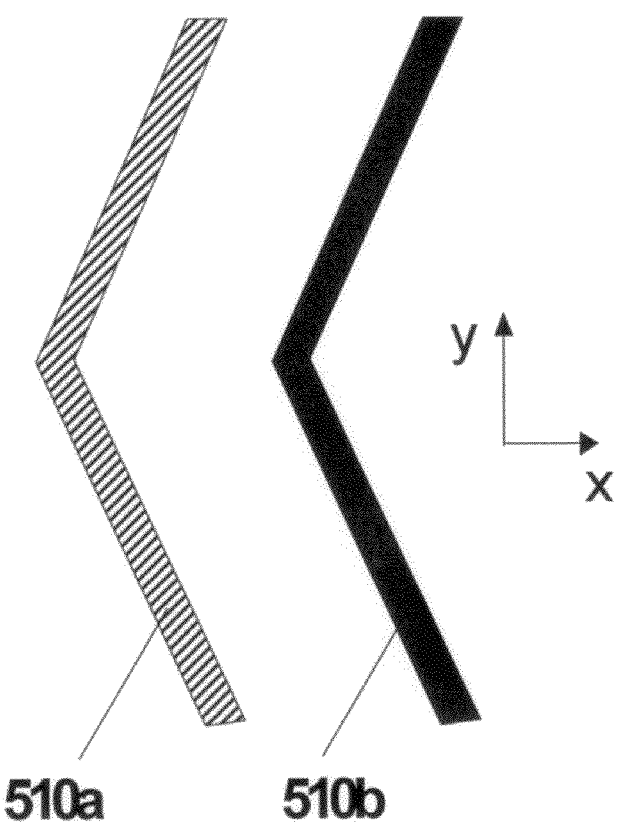
FIG. 5E is a top view of example of a chevron shaped electrode structure.
Figure 5F:
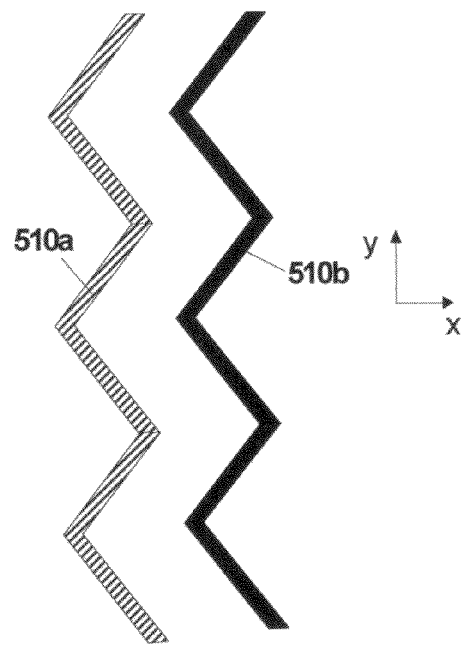
FIG. 5F is a top view of another example of a chevron shaped electrode structure.

The electrodes can also be formed as shown in FIG. 5C, where the pixel electrode 510a is formed in a way that a passivation layer 114a such as $SiO_2$ or $SiN_x$ is first formed in a trapezoid shape on the substrate 501a, and a conductive layer 515a such as metal or ITO is then coated above the passivation layer 514a. Similarly, the common electrode 510b can be full metal or ITO, or formed in the similar way as pixel electrode 510a by a passivation layer 514b and an overcoated conductive layer 515b. The top view of the electrodes is shown in FIG. 5D in a lengthwise direction along the y-axis in the x-y plane. Alternatively, the trapezoid electrodes can be V-shaped or a zigzag shape in the x-y plane as shown in FIG. 5E and FIG. 5F to further expand the viewing angle symmetry.

Figure 5G:
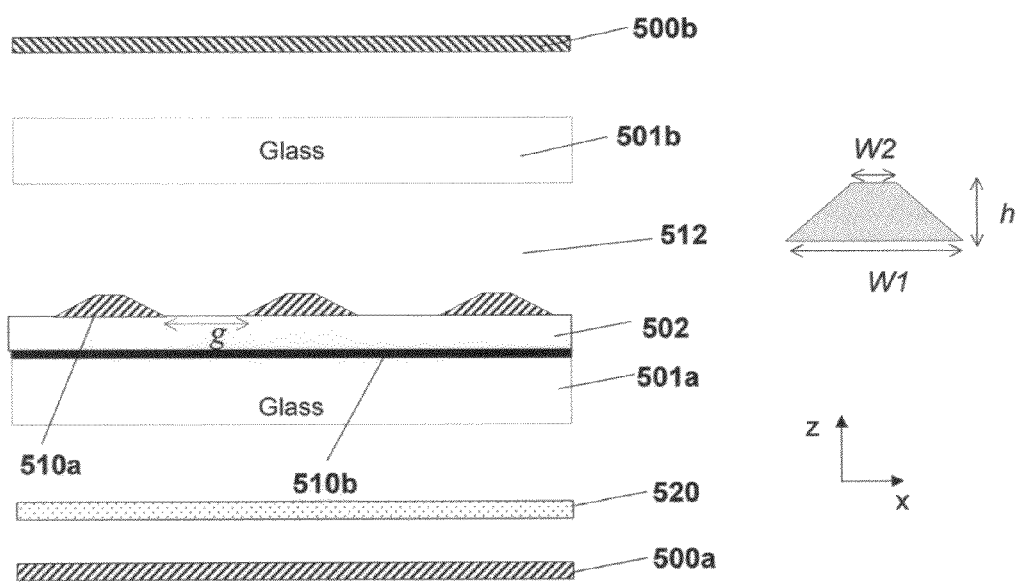
FIG. 5G is a cross-sectional view of an example blue phase liquid crystal cell.

FIG. 5G shows another embodiment of the present invention. The same numerals stand for the same components shown in FIGS. 5A to 5G. In this embodiment, the common electrode 510b is formed on the glass substrate 501a with a flat structure, an insulating layer 502 covers the common electrode 510b and trapezoid pixel electrodes 510a are formed on the insulating layer 502. Alternatively, the trapezoid pixel electrodes can be strip-shaped, V-shaped or a zigzag shape in the x-y plane as shown in FIG. 5D through FIG. 5F. A gap (g) is formed between the trapezoid pixel electrodes and is ranged between approximately 3 μm to approximately 10 μm.

Figure 6A:
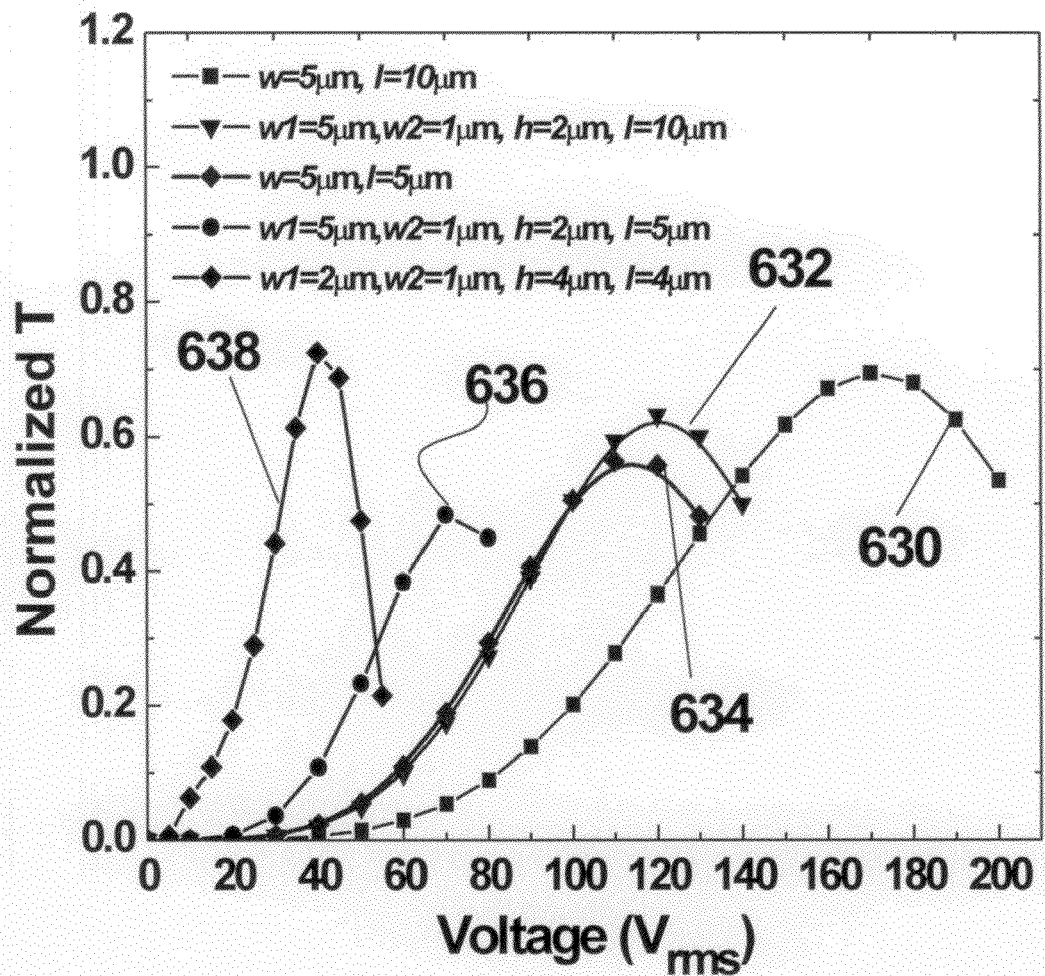
FIG. 6A is a diagram showing the calculated V-T curves.

FIG. 6A shows the calculated voltage-transmittance VT curves using the electrode structures shown in FIG. 5A. The detailed calculation model could be found in the paper by Ge et at [Ge et al, Electro-optics of polymer-stabilized blue phase liquid crystal displays, Appl. Phys. Lett. 94, 101104 (2009)]. Curve 630 stands for the VT curve using a thin thickness strip-shaped electrodes like that as shown in the cross sectional view shown in FIG. 1 and the top view shown in FIG.

5D with width w=5 μm and spacing l=10 μm, where the driving voltage is about 170 $V_{rms}$, and the maximum transmittance is about 70% (normalized to the maximum possible light efficiency of two parallel polarizers).

When the trapezoid electrode shown in the cross-sectional view in FIG. 5A, and top view shown in FIG. 5D is used with a bottom width w1=5 μm, top width w2=1 μm, a height h of 2 μm, and a same electrode spacing l=10 μm, the driving voltage is reduced significantly to about 120 $V_{rms}$, as shown in the new curve 632, but the peak transmittance is about 65%. When the spacing l is further reduced to l=5 μm, the strip-shaped design (shown in FIG. 1 which is a cross-sectional view and FIG. 5O which is a top view) has a voltage about 110 $V_{rms}$ in curve 634 and a transmittance about 55%, as the l/w ratio is reduced.

However, the trapezoid design shown in the cross-sectional view in FIG. 5A, and top view shown in FIG. 5O with w1=5 μm, top width w2=1 μm, electrode height h=2 μm can have a driving voltage of only 70 $V_{rms}$ and a transmittance of about 50%, as shown in curve 636. Comparing designs with l=5 μm and 10 μm, when the ratio of l/w decreases, the maximum efficiency also decreases as effective region (the spacing region) is reduced.

To further reduce the driving voltage, when the w1=2 μm, top width w2=1 μm, electrode height h=4 μm and electrode spacing l=4 μm, the driving voltage reaches almost 40 $V_{rms}$ as shown by curve 638 in FIG. 6A. In this example, because the l/w ratio is still high and the effective LC cell in the vertical direction is larger (as trapezoid height is larger), the maximum transmittance is about 72%. In all, the trapezoid electrode design does contribute to penetrate the electric fields deeper into the LC cell bulk region, and reduces the required driving voltage significantly.

Figure 6B:
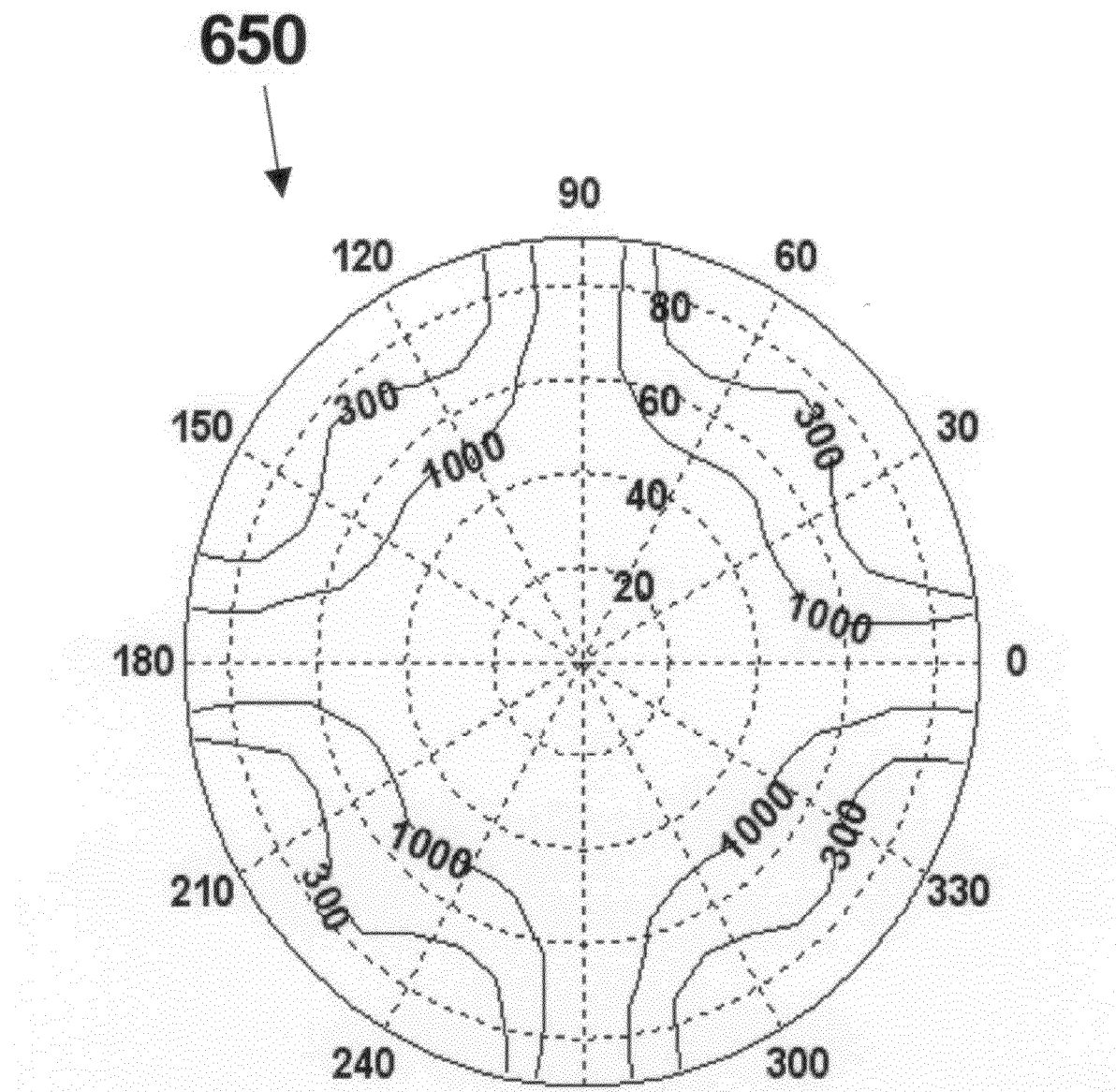
FIG. 6B is a graph showing the calculated iso-contrast plot.

The retardation film 520 can be a biaxial film with Nz=$(n_x-n_z)/(n_x-n_y)$=0.5, and in plane retardation d×$(n_x-n_y)$=λ/2. Here $n_x$, $n_y$, and $n_z$ is the refractive indices of the biaxial film, d is the film thickness, and λ is the wavelength of interest. For the compensation of viewing angle the $n_x$ axis is placed parallel to the absorption axis of the top linear polarizer. The viewing angle of the display is shown as the plot 650 in FIG. 6B, where the viewing angle of contrast ratio larger than 300:1 can be expanded to over 70° for most directions.

Figure 6C:
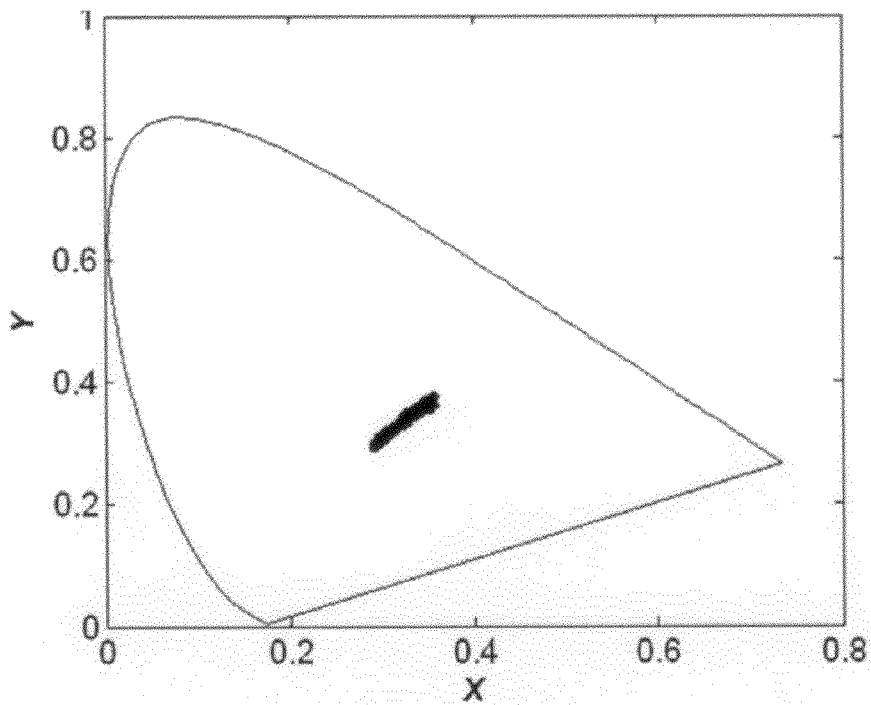
FIG. 6C to 6D are calculated color shift diagrams.
Figure 6D:
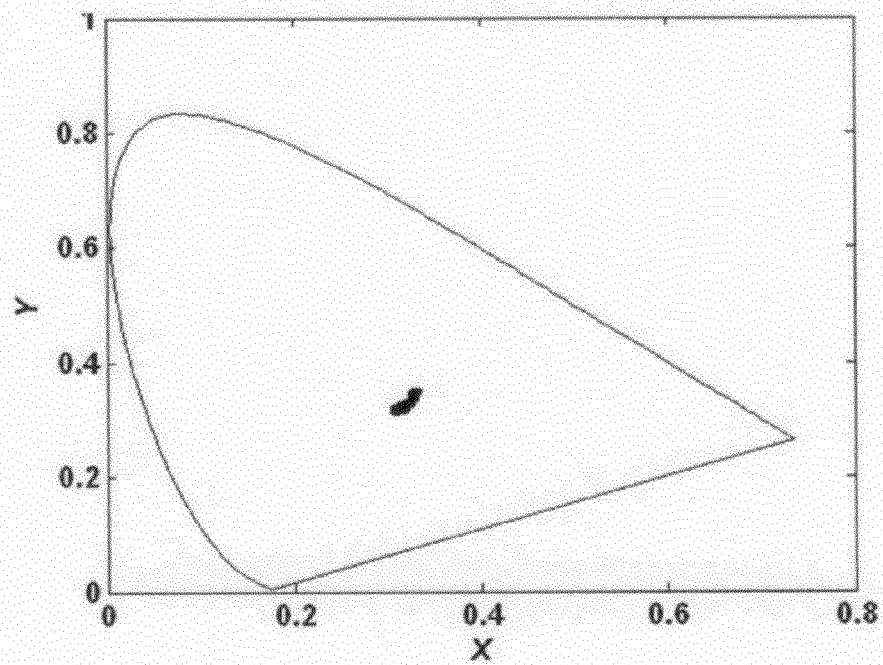

Using zigzag electrode structures can greatly reduce the color shift of the blue phase LCD, as the dependence of azimuthal angles is also reduced. FIG. 6C and FIG. 6D show plots the color shift of a blue phase LCD using strip electrodes shown in FIG. 5D (shown in FIG. 6C) and using V-shaped electrodes (shown in FIG. 6D). It can be clearly seen that the color shift of the V-shaped electrode structures is much weaker.

Figure 7A:
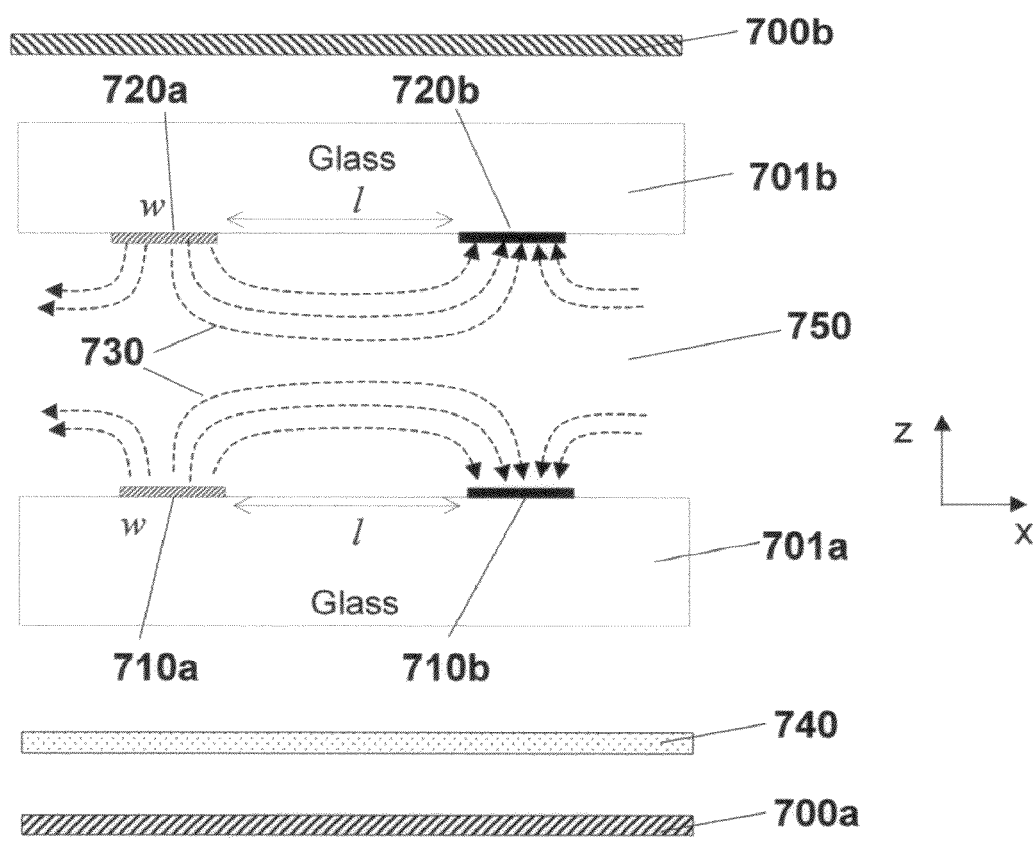
FIG. 7A is a cross-sectional view of an example blue phase liquid crystal cell.
Figure 7B:
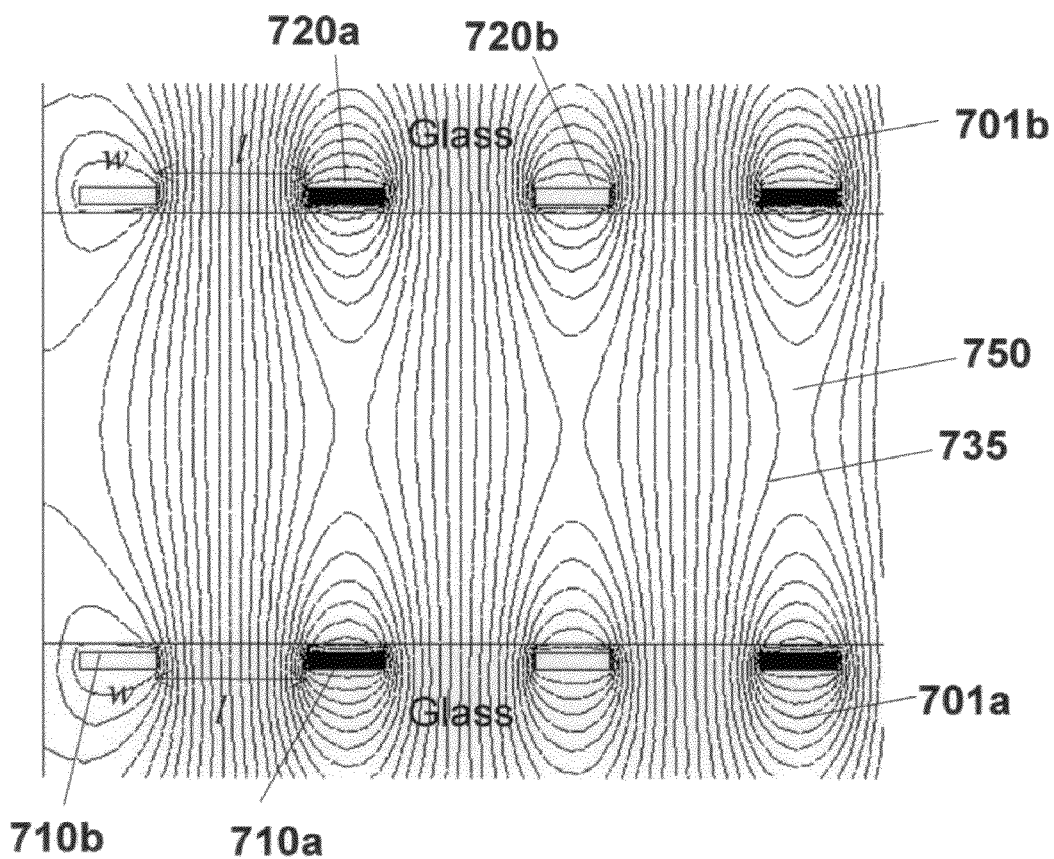
FIG. 7B is a schematic electric potential distribution diagram of FIG. 7A.

Yet in this embodiment, double sided IPS structures is used to lower the driving voltage while enhancing the transmittance. In this example, both stripe-shaped electrodes and trapezoid electrodes could be employed. FIG. 7A is a cross-sectional view showing the structure of the LCD cell for this example. A blue phase liquid crystal BPLC 750 is sandwiched between two glass substrates 701a and 701b, which together are interposed between a first linear polarizer 700a and a second linear polarizer 700b. A retardation film 740 such as a uniaxial film or biaxial film is inserted between the two polarizers as a means of expanding the viewing angle. Pixel electrodes 710a and common electrodes 710b are formed on the bottom substrate 701a, and pixel electrodes 720a and common electrodes 720b are formed on the top substrate 701b. Using double sided electrode structure, both bottom BPLC surface layer and top BPLC surface layer can be utilized to generate phase retardations, thus reducing the driving voltage. FIG. 7B shows the electric field potential lines 735 generated by the electrodes with on voltage.

Figure 7C:
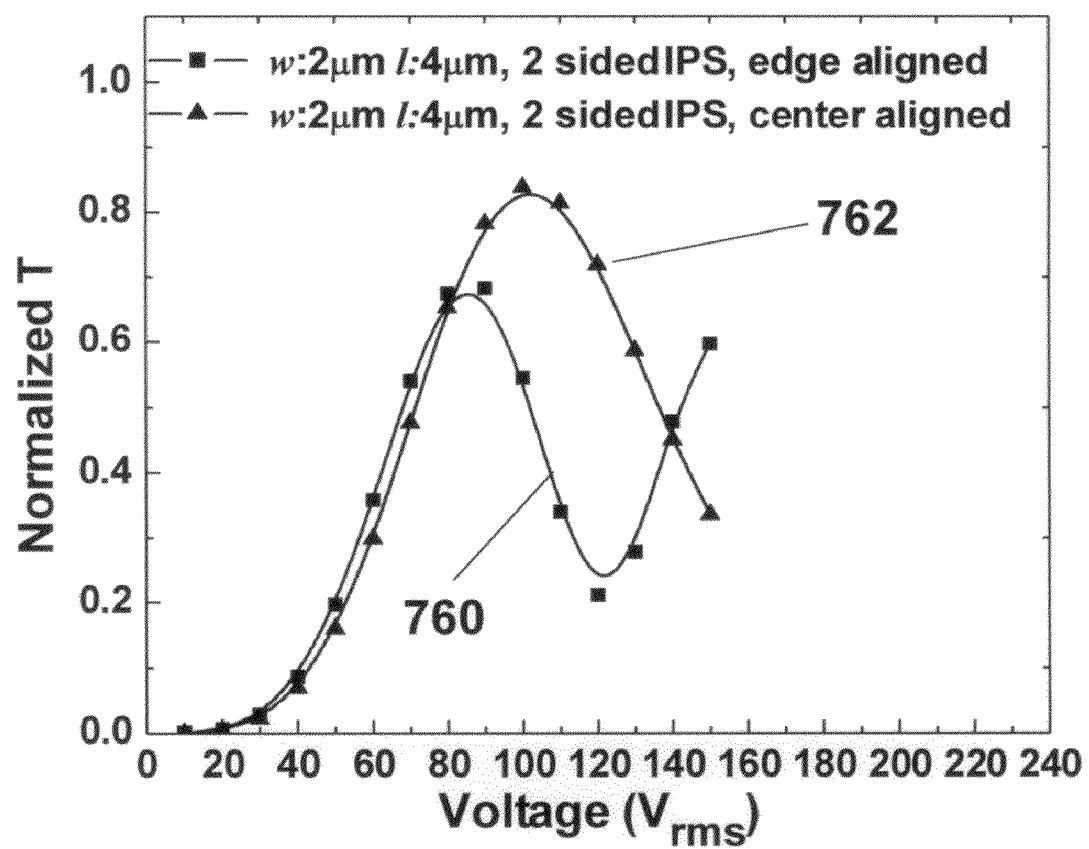
FIG. 7C is a diagram of calculated V-T curves.

FIG. 7C shows the computed voltage-transmittance VT curves of the present design. For curve 760, the top can bottom pixel electrodes have their edges well aligned with each other in the horizontal direction, where the maximum transmittance at about 68% is reached at V=80 $V_{rms}$, while it needs a driving voltage at about 130 $V_{rms}$ in a BPLCD using single sided in-plane-switching electrodes. Here the edge-aligned case means the same typed edges (e.g., right edge) of the pixel electrode strip on the bottom substrate and the pixel electrode strip on the top substrate have the same horizontal position (are aligned vertically). Under such a configuration, both surfaces have electric fields that penetrate into the LC bulk region, and a lower driving voltage can be attained.

Since the edges of two pixel (or common) electrode strips on the bottom and top substrates are well aligned vertically, the maximum transmittance could not be improved as compared to the structure only using electrodes on one substrate. In the regions above the electrode stripes, substantial vertical electric fields exist. Thus the induced Δn is more vertically pointed there, which has no contribution for the overall transmittance. The spacing region, on the other hand, have substantial horizontal fields, thus the Δn will function on the incident light to have a high transmittance (almost close to 100% in these regions locally) there. Therefore, averaging the transmittance from the area above the electrode strips (low transmittance) and that from the area between the electrode strips (very high), the overall light transmittance is roughly about l/(w+l). Therefore, when electrode edges are aligned, their effective areas with high transmittance (in the electrode spacing area) are overlapped. Therefore, the ratio l/(w+l) is not improved, but a lower voltage can be applied to get a same high transmittance in the spacing region, since both surfaces only need to have half induced retardation value as compared to the case with single-sided electrode strips.

Figure 7D:
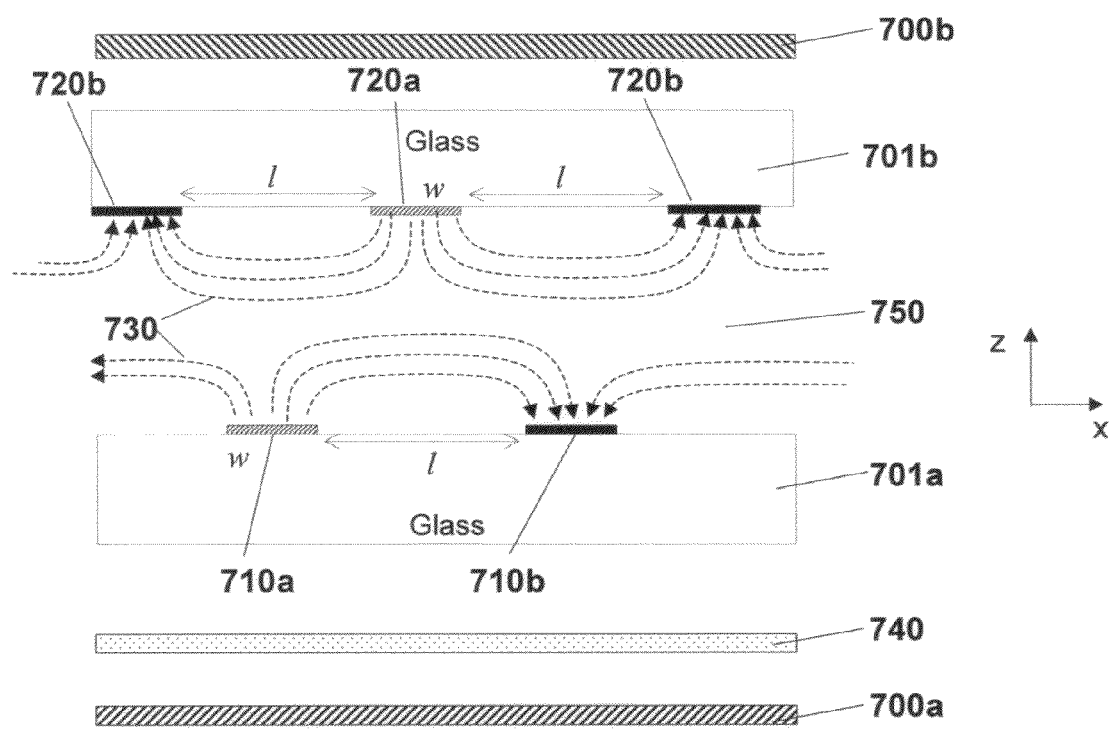
FIG. 7D is a cross-sectional view of an example blue phase liquid crystal cell.

From above analysis, to enhance the transmittance, the top electrode spacing region can be aligned with the bottom electrode stripes, thus they can self-compensate to eliminate the low transmittance zones for a high transmittance. For example, the low transmittance region above electrode strip 710a in FIG. 7D is overlapped with the high transmittance region between top electrode strips 720a and 720b. In the figure, for the second curve 762, the center of top pixel electrode stripe is aligned with the bottom spacing region center in the horizontal direction. The maximum transmittance is improved to be around 84%.

Figure 7E:
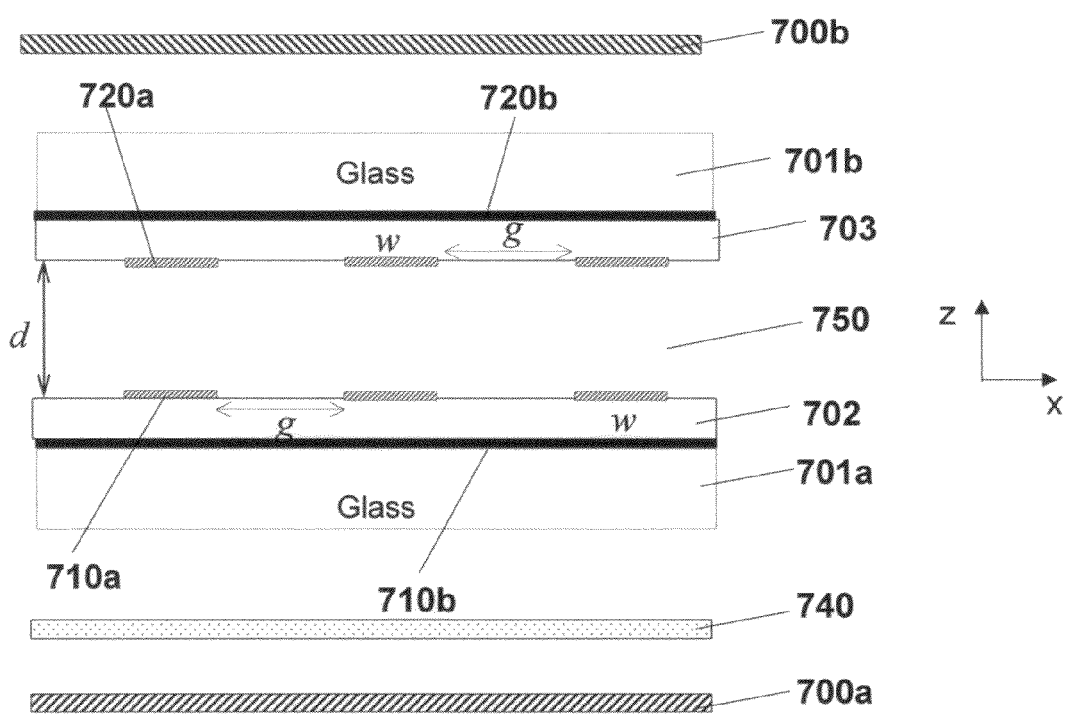
FIG. 7E is a cross-sectional view of an example blue phase liquid crystal cell.
Figure 7F:
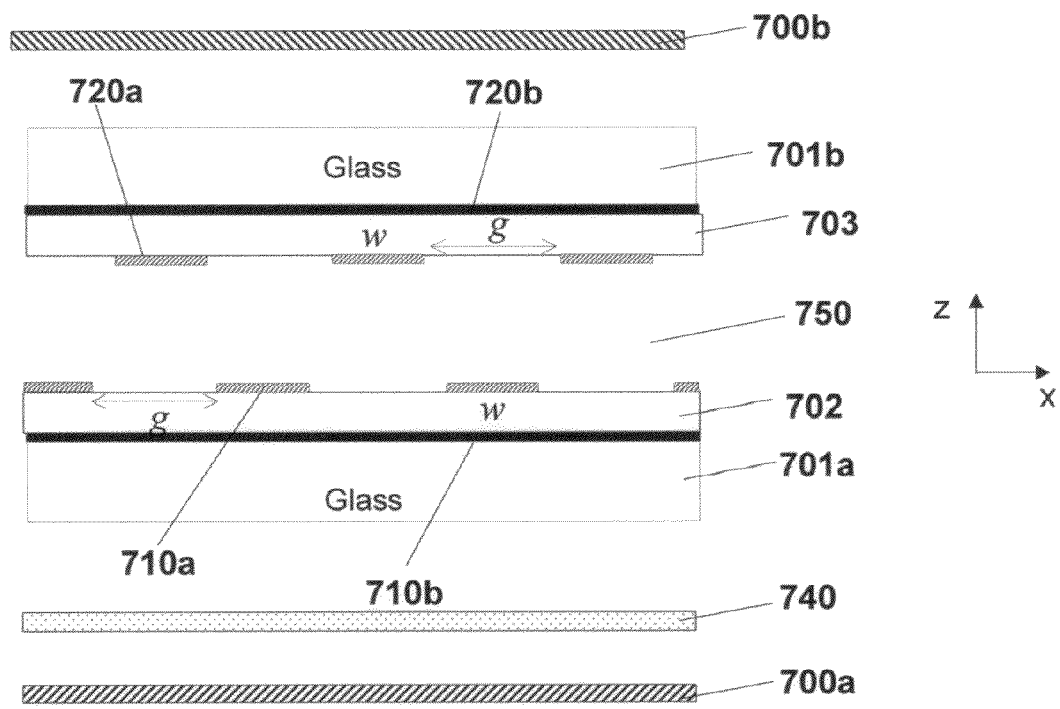
FIG. 7F is a cross-sectional view of an example blue phase liquid crystal cell.

FIG. 7E and FIG. 7F show another embodiments of the present invention. Double sided structures are used to lower the driving voltage while enhancing the transmittance. In these examples, both stripe-shaped electrodes and trapezoid electrodes could be employed. The same numerals stand for the same components shown in FIGS. 7A to 7F. In these embodiments, common electrodes 710b and 720b are formed on the glass substrate 701a and 701b with a flat structure, insulating layers 702 and 703 cover the common electrodes 710b and 720b and pixel electrodes 710a and 720a formed on the insulating layers 702 and 703. Alternatively, the pixel electrodes 710a and 720a can be strip-shaped, V-shaped or a zigzag shape in the x-y plane as shown in FIG. 5D to FIG. 5F. A gap (g) is formed between the pixel electrodes and is ranged between approximately 3 μm to approximately 10 μm.

Figure 8A:
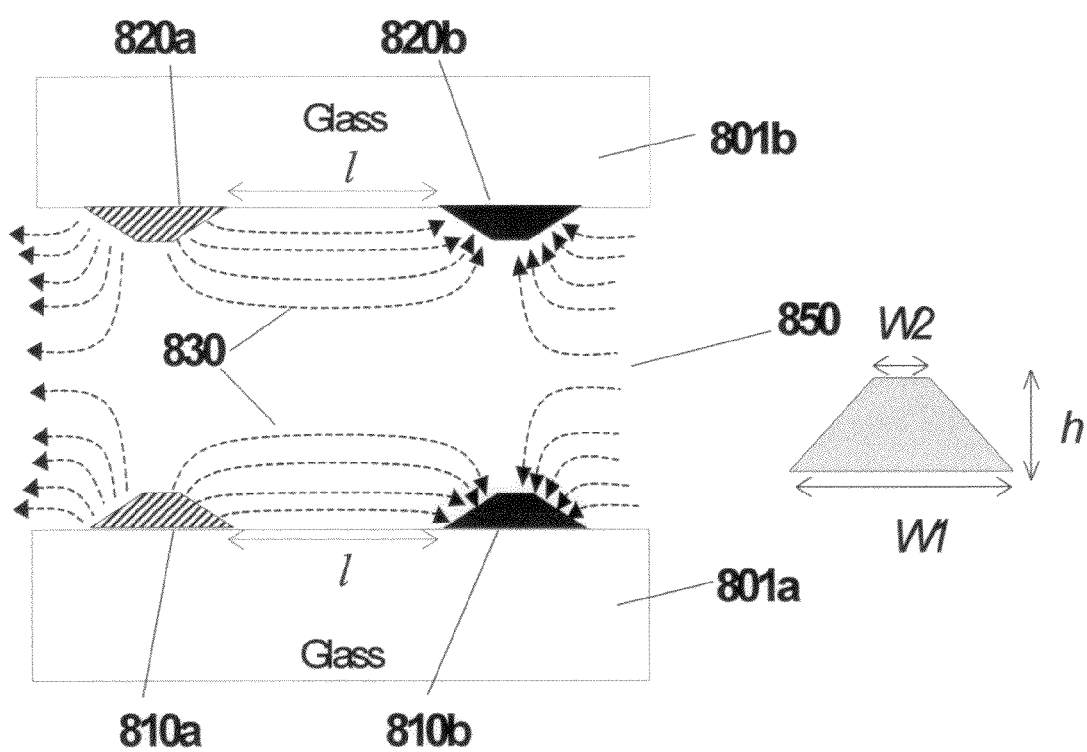
FIG. 8A is a cross-sectional view of an example blue phase liquid crystal cell.

Similarly, to further reduce the driving voltage, double sided trapezoid electrodes (pixel electrode 810a and common electrode 810b are formed on the bottom substrate 801a, and pixel electrode 820*a* and common electrode 820*b* are formed on the top substrate 801*b*) can also be employed, as shown in FIG. 8A.

Figure 8B:
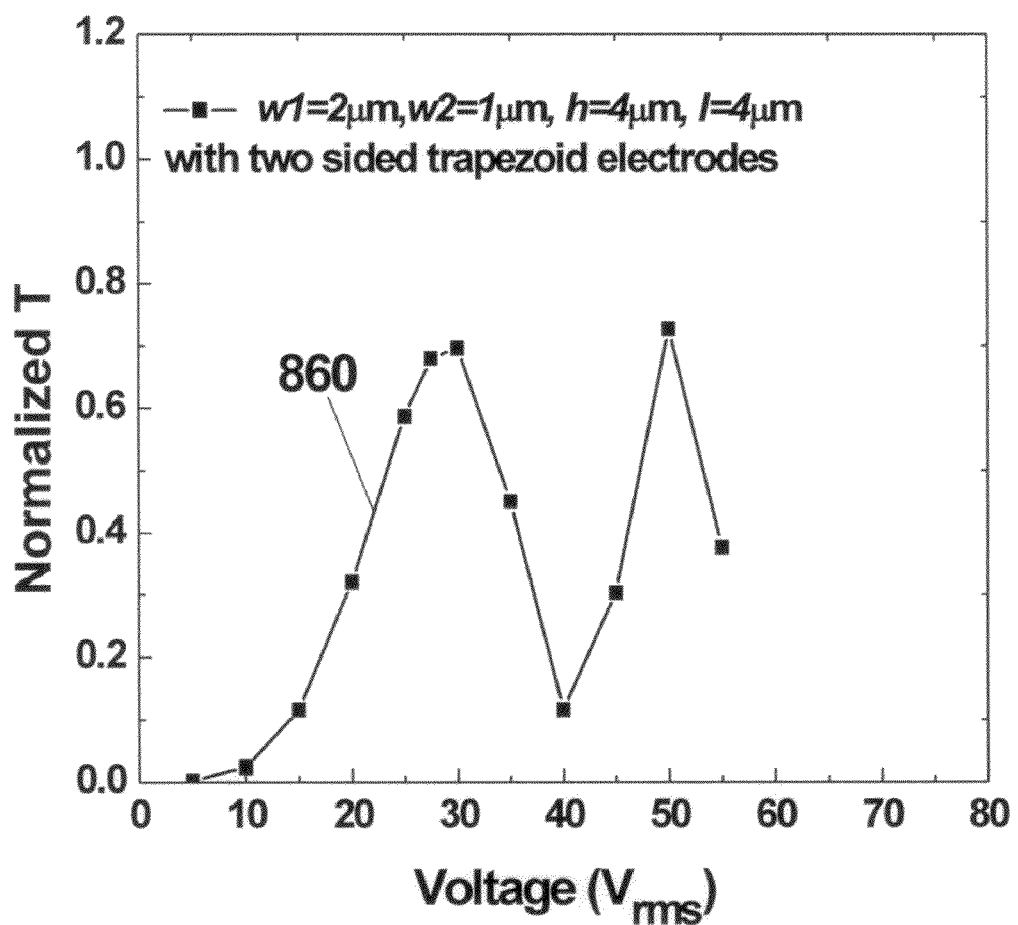
FIG. 8B is a diagram of calculated V-T curve.

In this structure, the electric fields (as indicated by the dashed arrows 830), would penetrate more into the LC bulk region. As one example, when the w1=2 μm, w2=1 μm, and h=4 μm, and electrode spacing l=4 μm, and bottom and top pixel electrode edges are aligned with each other, the voltage transmittance VT curve 860 shown in FIG. 8B has a low driving voltage only about 30 $V_{rms}$ with a maximum transmittance about 70%. In addition, without the departing from the spirit of the design, this device can also use a biaxial film to expand the viewing angle as is discussed in the embodiment 7, because their dark state is similar to each other with the BPLC at an isotropic state at zero-voltage.

Figure 8C:
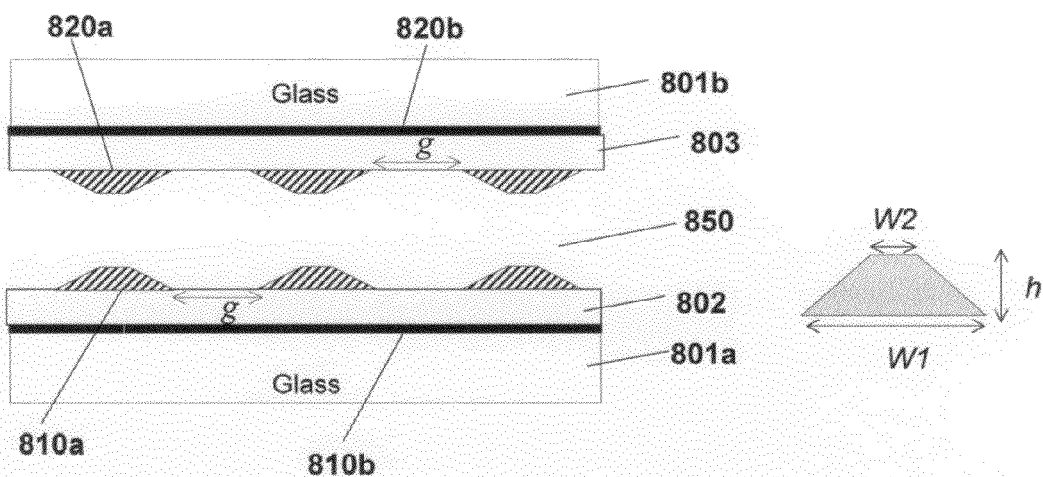
FIG. 8C is a cross-sectional view of an example blue phase liquid crystal cell.

FIG. 8C shows another embodiment of the present invention. Double sided structures are used to lower the driving voltage while enhancing the transmittance. The same numerals stand for the same components shown in FIGS. 8A to 8C. In this embodiment, common electrode 810*b* and 820*b* are formed on the glass substrate 801*a* and 801*b* with a flat structure, insulating layers 802 and 803 cover the common electrode 810*b* and 820*b* and trapezoid pixel electrodes 810*a* and 820*a* formed on the insulating layers 802 and 803. Alternatively, the trapezoid pixel electrodes can be strip-shaped, V-shaped or a zigzag shape in the x-y plane as shown in FIG. 5D to FIG. 5F. A gap (g) is formed between the trapezoid pixel electrodes and is ranged between approximately 3 μm to approximately 10 μm.

Figure 9A:
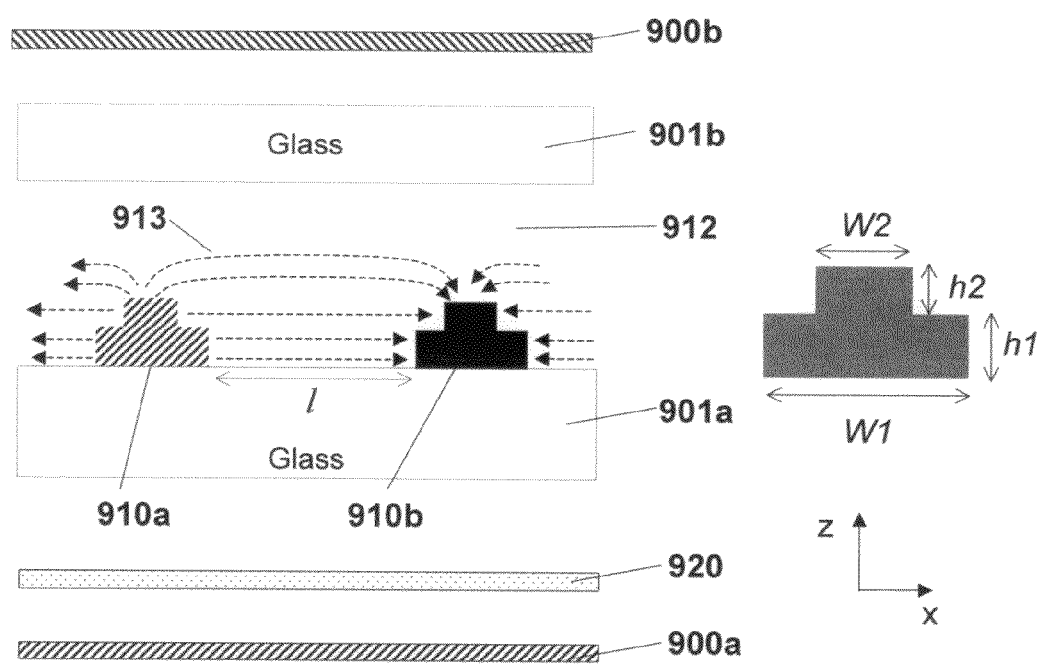
FIG. 9A is a cross-sectional view of an example blue phase liquid crystal cell.
Figure 9B:
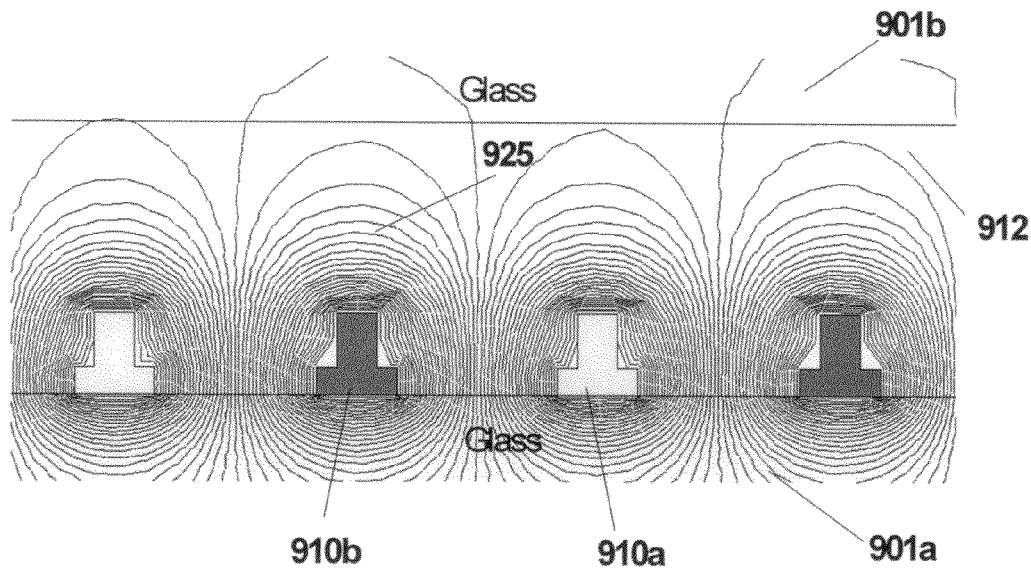
FIG. 9B is a schematic electric potential distribution diagram of FIG. 9A.

Yet in another embodiment, uses T shaped electrode structures for further lowering the driving voltage while enhancing the transmittance. In the display shown in FIG. 9A, the BPLC cell 912 is formed between the bottom glass substrate 901*a* and 901*b*, which together are sandwiched between a bottom linear polarizer 900*a* and a top linear polarizer 900*b*. To expand the viewing angle of the display, a compensation film 920, which could be a uniaxial or a biaxial film is further inserted between these two polarizers. Specially here, T-shaped pixel electrode 910*a* and common electrode 910*b* are formed on the same bottom substrates to generate even more flourish electric fields into the LC bulk region. The cross-sectional dimension of the T-shaped electrode with two rectangles is depicted as well in the same figure, where the bottom width is w1, the width of the top rectangle is w2, the height of the first rectangle is h1, and the height of the top rectangle is h2. Lines 613 represent the electric fields in the BPLC cell. FIG. 9B shows the electric potential distribution of the design when voltage is applied. As we can see from electric potential lines 925, the first rectangle helps to generate strong horizontal fields near the surface, and the second rectangle functions to penetrate the fields deeper in the vertical direction (z-direction) in addition to horizontal fields.

Figure 9C:
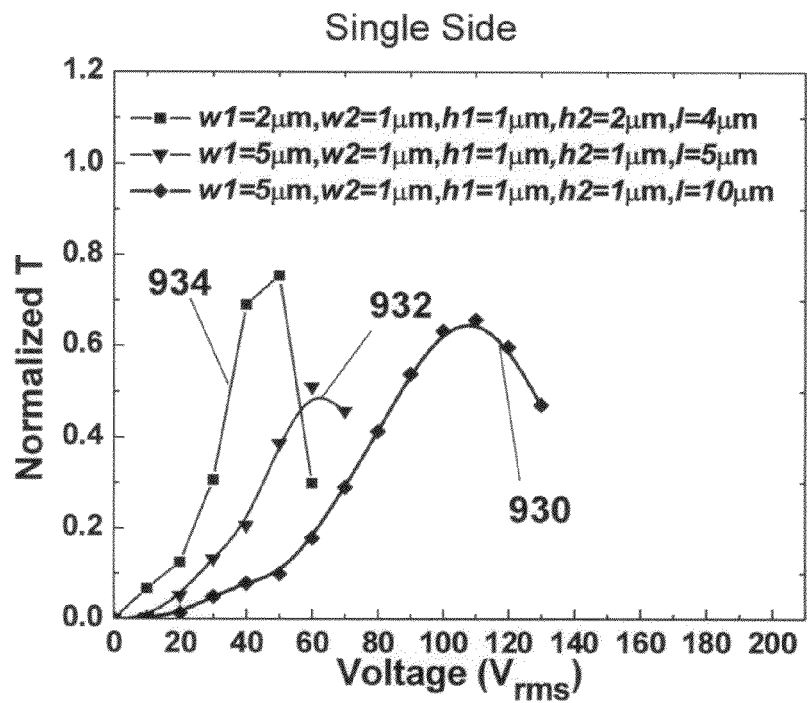
FIG. 9C is a diagram of calculated V-T curves.

FIG. 9C shows the calculated VT curves of the present designs. Curve 930 is the case with w1=5 μm, w2=1 μm, h1=1 μm, h2=1 μm, and electrode spacing l=10 μm, where its maximum transmittance reaches about 63% at V=110 $V_{rms}$. When the spacing l is reduced to 5 μm, the maximum transmittance changes to about 50% with a lower driving voltage of 60 $V_{rms}$, as the curve 932 shows. Further when w1=2 μm, w2=1 μm, h1=1 μm, h2=2 μm, and electrode spacing l=4 μm, the transmittance peaks at about 77% at V=50 $V_{rms}$ as the curve 934 shows. As compared to abovementioned structures using trapezoid electrodes, this T shaped electrode design could also significantly lower the driving voltage.

Figure 9D:
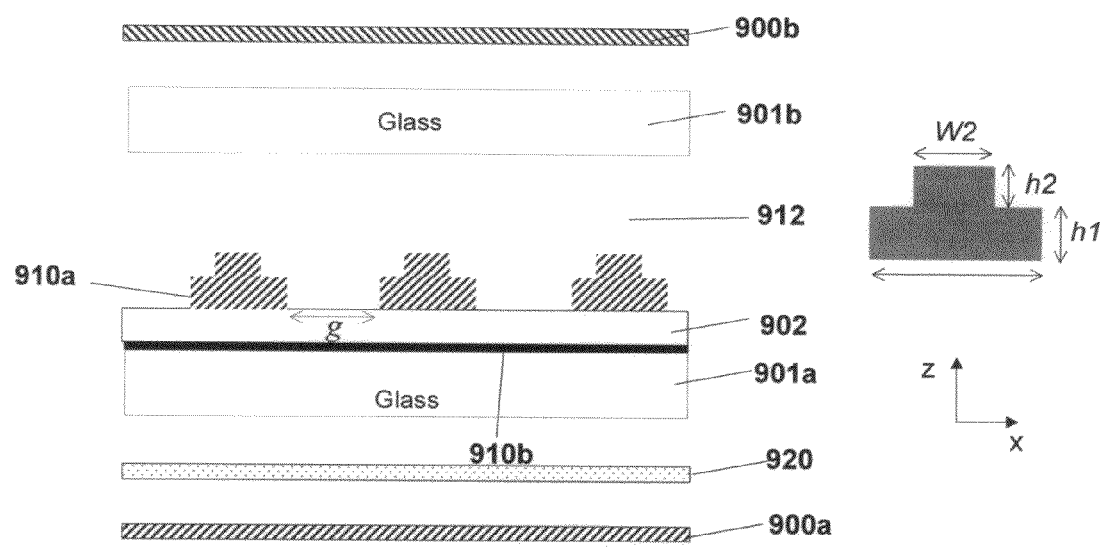
FIG. 9D is a cross-sectional view of an example blue phase liquid crystal cell.

FIG. 9D shows another embodiment of the present invention. The same numerals stand for the same components shown in FIGS. 9A to 9D. In this embodiment, common electrode 910*b* is formed on the glass substrate 901*a* with a flat structure, an insulating layer 902 covers the common electrode 910*b* and T-shaped pixel electrodes 910*a* formed on the insulating layer 902. Alternatively, the T-shaped pixel electrodes can be strip-shaped, V-shaped or a zigzag shape in the x-y plane as shown in FIG. 5D to FIG. 5F. A gap (g) is formed between the T-shaped pixel electrodes and is ranged between approximately 3 μm to approximately 10 μm.

Figure 10A:
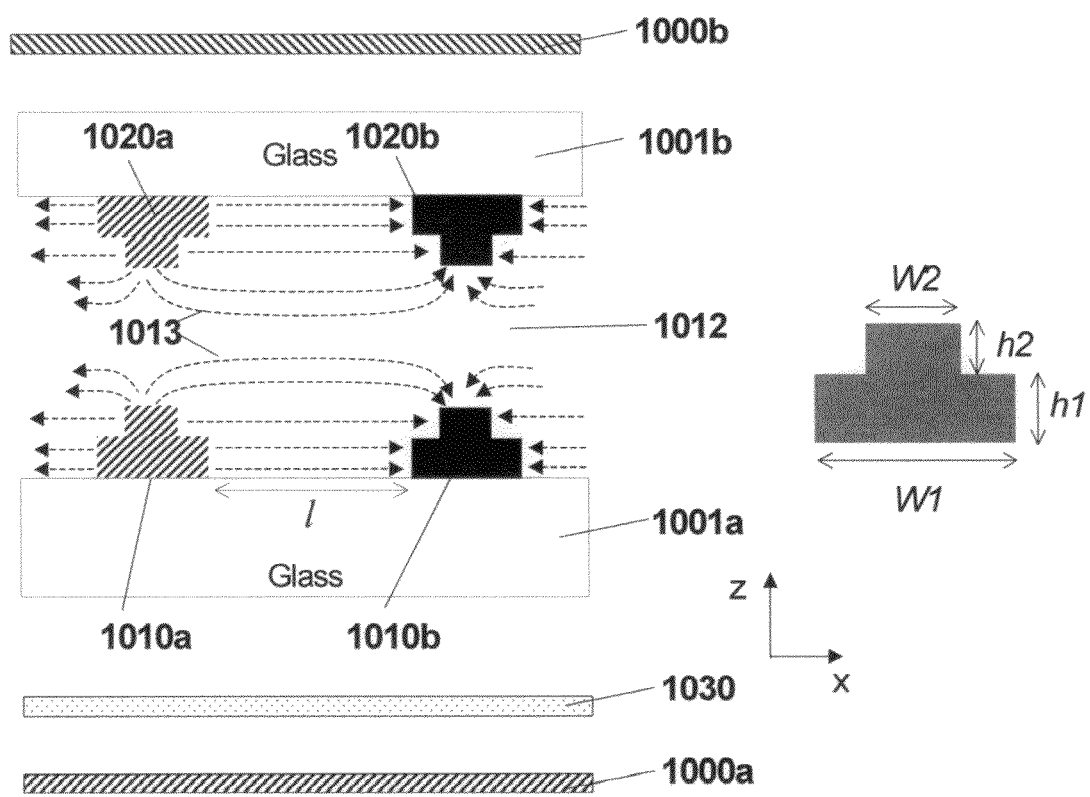
FIG. 10A is a cross-sectional view of an example blue phase liquid crystal cell.

Similarly, double sided electrode structure could be employed to further reduce the driving voltage of the device as shown in FIG. 10A. The BPLC cell 1012 is formed between a bottom substrate 1001*a* and a top substrate 1001*b*, which together are sandwiched between the bottom linear polarizer 1000*a* and the top one 1000*b*. A compensation film 1030 is inserted between the polarizers to expand the viewing angle. On the bottom substrate, T shaped pixel electrode 1010*a* and common electrode 1010*b* are formed there as a first group of electrodes. T shaped pixel electrode 1020*a* and common electrode 1020*b* are formed on the top substrate as the second group of electrodes. The electric field profile is plotted as the dashed-arrows 1013.

Figure 10B:
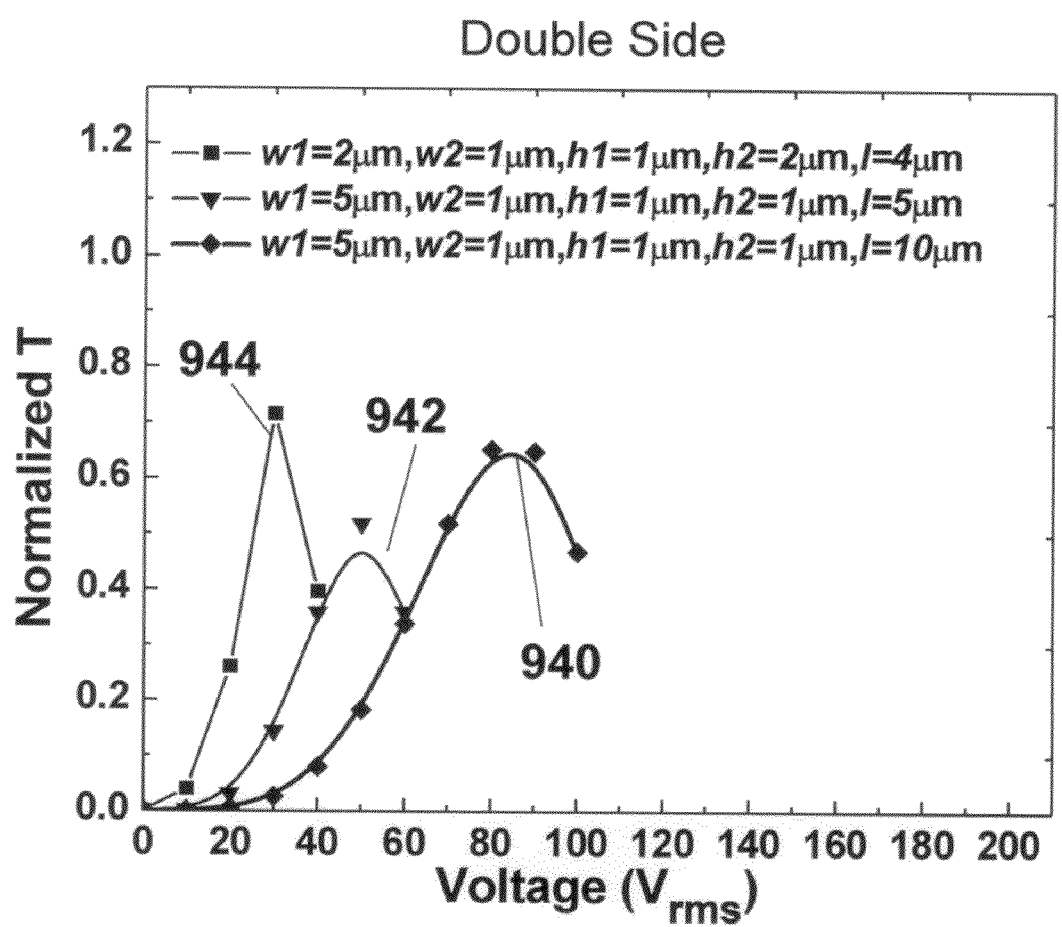
FIG. 10B is a diagram of calculated V-T curves.

The calculated results are shown in FIG. 10B. For w1=5 μm, w2=1 μm, h1=1 μm, h2=1 μm, and electrode spacing l=10 μm, the driving voltage is reduced to about 85 $V_{rms}$ with a peak transmittance of about 63% in curve 940. For w1=5 μm, w2=1 μm, h1=1 μm, h2=1 μm, and electrode spacing l=5 μm, the driving voltage is reduced to about 50 $V_{rms}$ with a peak transmittance of about 50% in curve 942. And for w1=2 μm, w2=1 μm, h1=1 μm, h2=2 μm, and electrode spacing l=4 μm, the driving voltage is reduced to about 30 $V_{rms}$ with a peak transmittance of about 72% in curve 944. In addition, without the departing from the spirit of the design, this device can also use a biaxial film to expand the viewing angle as is discussed, because their dark state is similar to each other with the BPLC at an isotropic state at zero-voltage.

Figure 10C:
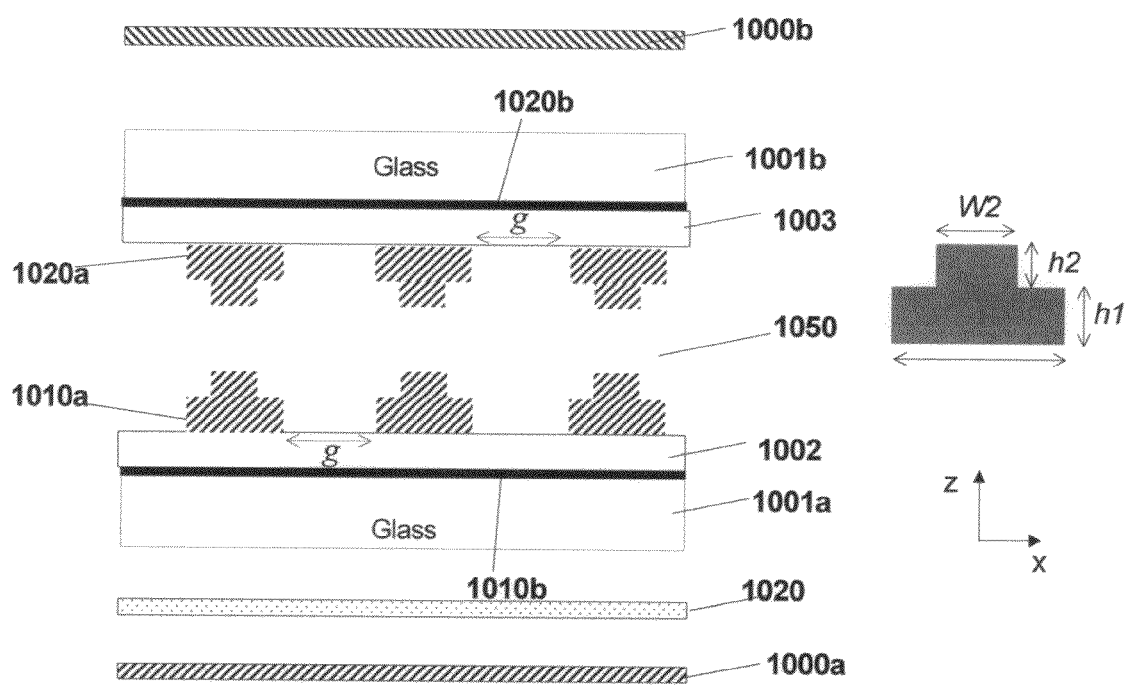
FIG. 10C is a cross-sectional view of an example blue phase liquid crystal cell.

FIG. 10C shows another embodiment of the present invention. Double sided structure is used to lower the driving voltage while enhancing the transmittance. The same numerals stand for the same components shown in FIGS. 10A to 10C. In this embodiment, common electrodes 1010*b* and 1020*b* are formed on the glass substrate 1001*a* and 1001*b* with a flat structure, insulating layers 1002 and 1003 cover the common electrodes 1010*b* and 1020*b* and T-shaped pixel electrodes 1010*a* and 1020*a* formed on the insulating layers 1002 and 1003. Alternatively, the T-shaped pixel electrodes 1010*a* and 1020*a* can be strip-shaped, V-shaped or a zigzag shape in the x-y plane as shown in FIG. 5D to FIG. 5F. A gap (g) is formed between the pixel electrodes and is ranged between approximately 3 μm to approximately 10 μm.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A liquid crystal composition comprises a liquid crystal component or a highly polar liquid crystal component, wherein the liquid crystal component is selected from those of formula (II):

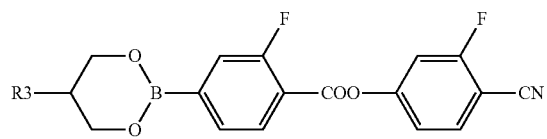

(II)

wherein R3 is selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF2) and carbon trifluoride groups (CF3), one or more CH2 groups of the substituted alkyl groups having from 1 to 10 carbon atoms, or the substituted alkenyl groups having from 1 to 10 carbon is replaced by —O—, —S—, —COO—, —CO—, —OCO— or —O—COO—;

the highly polar liquid crystal component is selected from

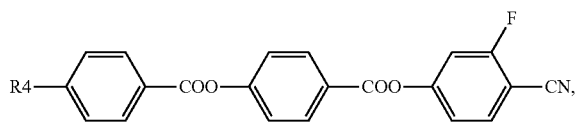

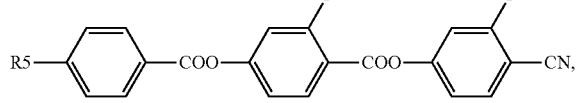

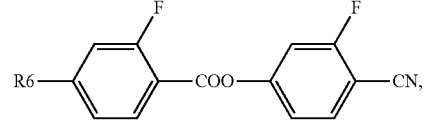

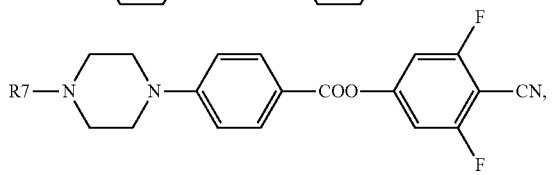

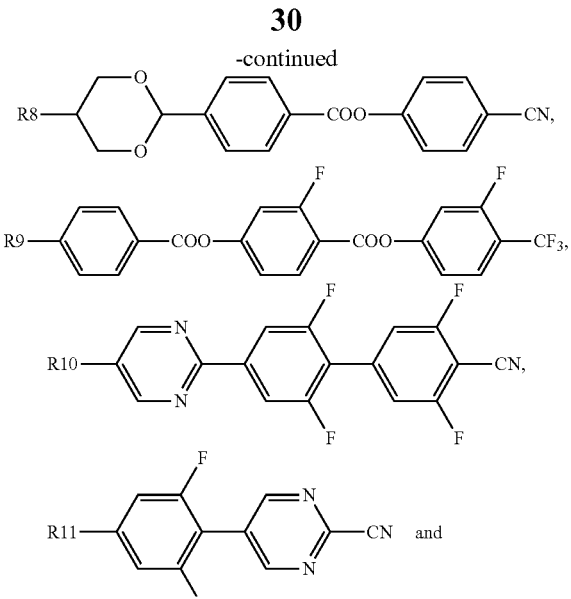

wherein R4 to R12 are selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF2) and carbon trifluoride groups (CF3), one or more CH2 groups of the substituted alkyl groups having from 1 to 10 carbon atoms, or the substituted alkenyl groups having from 1 to 10 carbon is replaced by —O—, —S—, —COO—, —CO—, —OCO— or —O—COO—.

2. The liquid crystal composition according to claim 1, wherein the highly polar liquid crystal component is further selected from

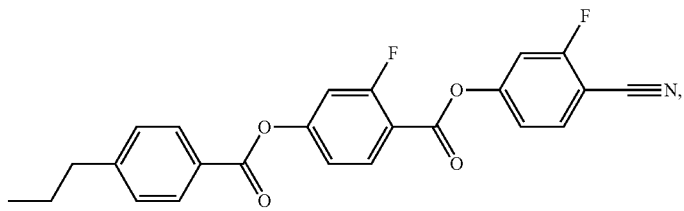

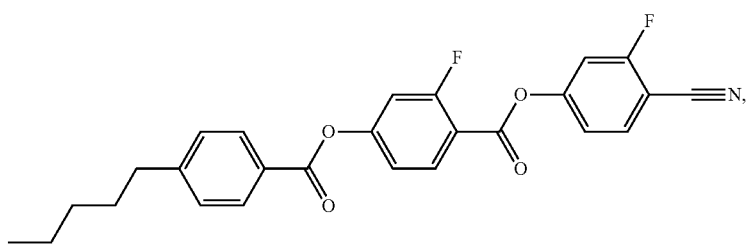

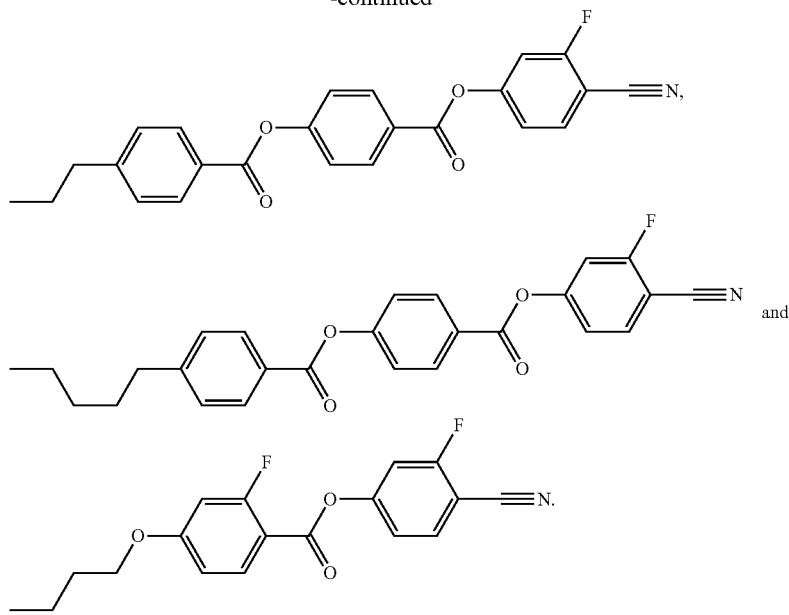

3. The liquid crystal composition according to claim 1, further includes a highly conjugated liquid crystal component is selected from 4. The liquid crystal composition according to claim 3, wherein the highly conjugated liquid crystal component is further selected from

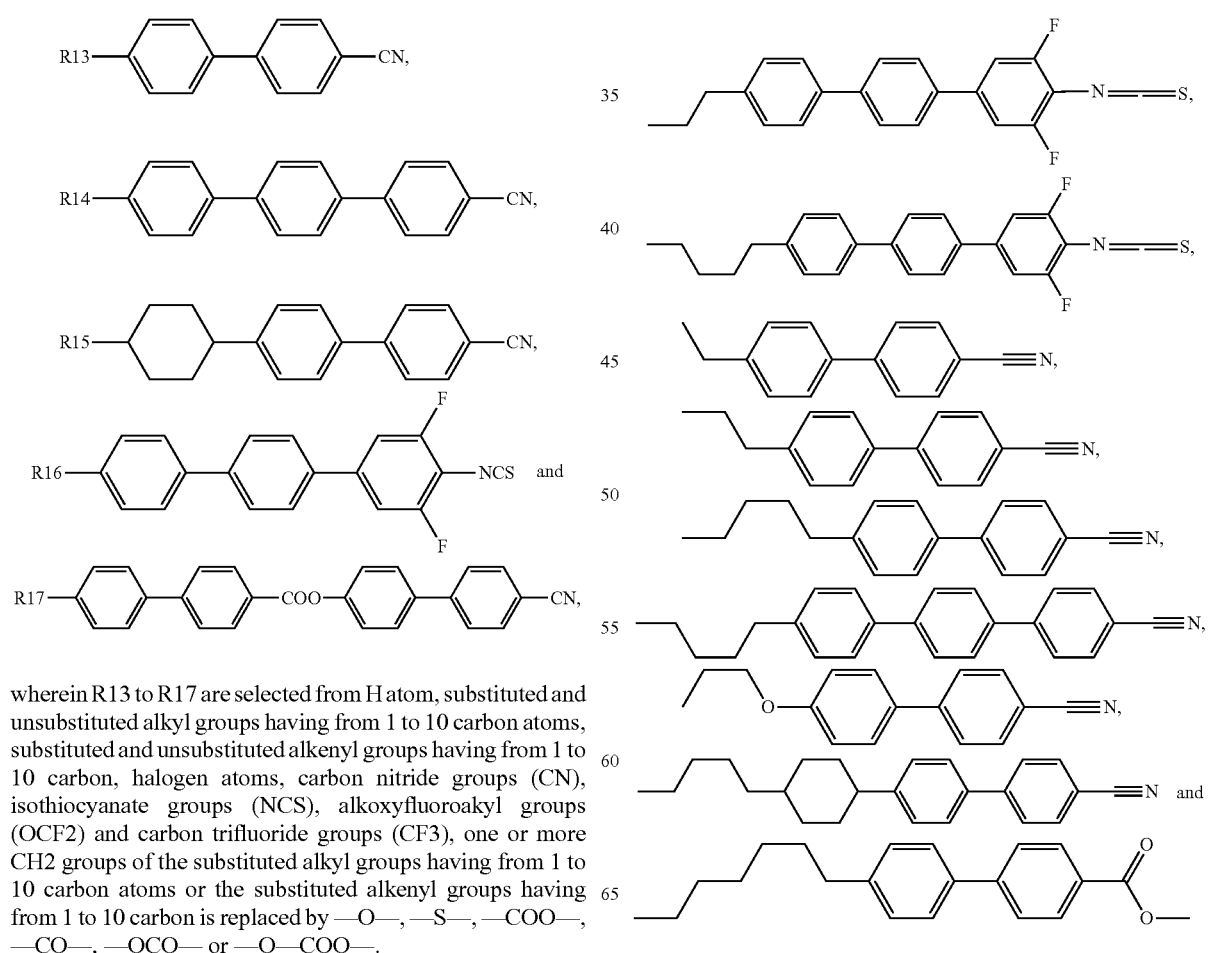

wherein R13 to R17 are selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF2) and carbon trifluoride groups (CF3), one or more CH2 groups of the substituted alkyl groups having from 1 to 10 carbon atoms or the substituted alkenyl groups having from 1 to 10 carbon is replaced by —O—, —S—, —COO—, —CO—, —OCO— or —O—COO—.

-continued

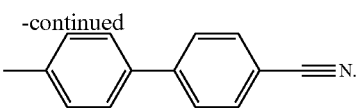

5. The liquid crystal composition according to claim 1, further includes: a chiral dopant to induce a blue phase in the liquid crystal composition, wherein the chiral dopant is in an amount between approximately 4 weight % and approximately 35 weight % of the total weight of the liquid crystal composition.

6. The liquid crystal composition according to claim 1, wherein the liquid crystal component is used in a range of approximately 5% to 70% by weight of the total content of a liquid crystal composition used in a thin film transistor (TFT) based liquid crystal display.

7. The liquid crystal composition according to claim 1, wherein the liquid crystal component is structured as

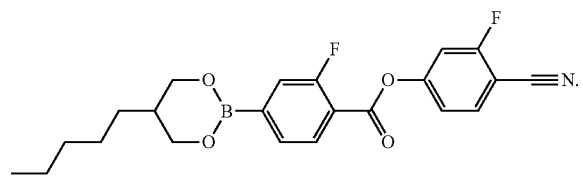

8. The liquid crystal composition according to claim 1, further exhibits high optical and dielectric anisotropies with operational temperatures in a range between approximately −40° C. and approximately 106° C.

9. The liquid crystal composition according to claim 1, further has a core group, at least one of a terminal group, a lateral group connected to the core group, wherein the core group has a first end and a second end and forms a central axis and is selected from a cyclic group consisting of at least one of a phenyl group, a cyclohexyl group and a heterocyclic group;

the terminal group attaches to the first end and the second end of the core group and is selected from a non-polar group consisting of at least one of an alkyl group, an alkoxy group, and an alkenyl group and a polar group selected from at least one of fluorine (F), chlorine (Cl), carbon nitride (CN), isothiocyanate (NCS), an alkoxyfluoroakyl radical (OCF2) and carbon trifluoride (CF3) to increase optical anisotrophy through elongated π-electron conjugation along the principal molecular axis;

the lateral group is positioned between the first end and second end of the core group and is selected from a non-polar group consisting of at least one of an alkyl group, an alkoxy group, and an alkenyl group and a polar group selected from at least one of fluorine (F), chlorine (Cl), carbon nitride (CN), isothiocyanate (NCS), an alkoxyfluoroakyl radical (OCF2) and carbon trifluoride (CF3) to increase melting point temperatures of the liquid crystal composition; and the resulting liquid crystal composition exhibits high optical and dielectric anisotropies with operational temperatures in a range between approximately −40° C. and approximately 106° C., low threshold and operating voltage, and light efficiency in liquid crystal display applications.

10. A liquid crystal display device comprising:
a first transparent substrate;
a second transparent substrate;
a liquid crystal cell having a blue phase liquid crystal layer sandwiched between the first and the second transparent substrates;
a first linear polarizer disposed behind the viewer's side of the liquid crystal layer;
a second linear polarizer disposed on the viewer's side of the liquid crystal layer;
at least one optical retardation compensator disposed between the first and second linear polarizers;
plural pixels with patterned driving electrodes are formed on the first or the second substrates, each having
a first patterned pixel electrode used as the driving pixel electrode;
a second electrode used as the common electrode;
wherein each of the pixel electrodes has a substantial electrode height over 0.5 μm formed above the substrate surface into the LC bulk region to penetrate substantial electric fields into the HPLC cell, and the electric fields from these electrodes induce the birefringence for the light to gain phase retardation to different gray levels.

11. The liquid crystal display device according to claim 10, wherein each of the pixel electrodes height is in a range of approximately 2 μm to approximately 4 μm.

12. The liquid crystal display device according to claim 10, wherein a cell gap of the blue phase liquid crystal layer formed between the first and the second transparent substrates is in a range of approximately 2 μm to approximately 20 μm.

13. The liquid crystal display device according to claim 10, wherein each of the pixel electrodes are formed in a trapezoidal shape with a bottom width ranged between approximately 2 μm to approximately 10 μm, a top width ranged between approximately 1 μm to approximately 5 μm and a vertical height within a range between approximately 0.5 μm to approximately 5 μm.

14. The liquid crystal display device according to claim 10, wherein each of the pixel electrodes and the common electrodes are formed in a T shape with a bottom width ranged between approximately 2 μm to approximately 10 μm, a top width ranged between approximately 1 μm to approximately 5 μm, a first height ranged between approximately 0.5 μm to approximately 3 μm and a second height ranged between approximately 0.5 μm to approximately 3 μm.

15. The liquid crystal display device according to claim 10, wherein the pixel electrodes and the common electrodes are formed on same substrate.

16. The liquid crystal display device according to claim 10, wherein the pixel electrodes and the common electrodes are formed on opposite substrates.

17. The liquid crystal display device according to claim 10, wherein a shape of the pixel electrodes and the common electrodes is selected from a lengthwise strip shape, a V-shape, a zigzag shape and a comb-shape.

18. The liquid crystal display device according to claim 10, wherein the pixel electrodes and the common electrodes are formed on both the first substrate and the second substrate.

19. The liquid crystal display according to claim 10 wherein the first linear polarizer and the second linear polarizer consist of a dichroic polymer films having their transmission axis perpendicular to each other.

20. The liquid crystal display according to claim 19 wherein the first linear polarizer and the second linear polarizer consists of a polyvinyl-alcohol-based film having their transmission axis perpendicular to each other.

21. The display according to claim 10 wherein the retardation film is a biaxial film with its Nz factor (Nz=(nx−nz)/(nx−ny)) at about 0.5, and the in-plane phase retardation R0=dx (nx−ny) between 250 nm and 300 nm.

22. The liquid crystal display device according to claim 10, wherein the liquid crystal layer contains liquid crystal molecules, wherein at least one of the liquid crystal molecules is selected from those of formula (I):

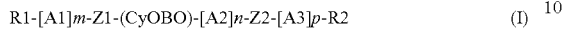

wherein R1 and R2 are the same or different, and R1 and R2 are selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF2) and carbon trifluoride groups (CF3), one or more CH2 groups of the substituted alkyl groups having from 1 to 10 carbon atoms or the substituted alkenyl groups having from 1 to 10 carbon is replaced by —O—, —S—, —COO—, —CO—, —OCO— or —O—COO—;

A1, A2, and A3 are the same or different, and A1, A2, and A3 are selected from 1,4-cyclohexylene, 1,4-cyclohexenylene, 1,4-phenylene, 2,6-naphthalene, 2,6-tetrahydronaphtalene, 2,6-dihydronaphthalene, 4,4'-biphenylene, 2- or 3-fluoro, or 2,3-difluo-1,4-phenylene, 7-fluoro, 8-fluoro, 7,8-difluoro, 1,7,8-trifluoronaphthalene, 4'-[2',6',3,5-tetrafluoro]-4-biphenyl, 4'-[2',3,5-trifluoro]-4-biphenyl, 4'-[3,5-difluoro]-4-biphenyl, and 4'-[3-difluoro]-4-biphenyl;

Z1 and Z2 are the same or different, and Z1 and Z2 are selected from a single bond, —CH2CH2-, —CH=CH—, —C≡C—, —COO—, —CO—, —OCO— and —O—COO—;

m, n and p are the same or different, and m, n and p are selected from 0, 1 or 2, in which at least one of m, n, and p should be ≧1; and CyOBO is represented by the structural formula,

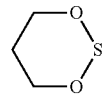

which is a 1,4 cyclohexyl ring substituted with a 1,3,2-dioxaborinane-2,5 diyl group.

23. The liquid crystal display device according to claim 10, wherein the liquid crystal layer contains liquid crystal molecules, wherein at least one of the liquid crystal molecules is selected from those of formula (II):

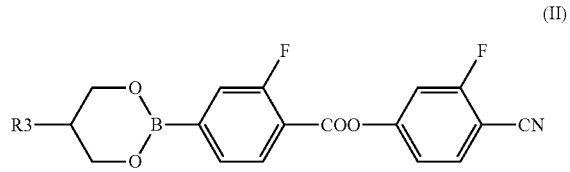

wherein R3 is selected from H atom, substituted and unsubstituted alkyl groups having from 1 to 10 carbon atoms, substituted and unsubstituted alkenyl groups having from 1 to 10 carbon, halogen atoms, carbon nitride groups (CN), isothiocyanate groups (NCS), alkoxyfluoroakyl groups (OCF2) and carbon trifluoride groups (CF3), one or more CH2 groups of the substituted alkyl groups having from 1 to 10 carbon atoms or the substituted alkenyl groups having from 1 to 10 carbon is replaced by —O—, —S—, —COO—, —CO—, —OCO— or —O—COO—.

24. A liquid crystal display device comprising:
a first transparent substrate;
a second transparent substrate;
a liquid crystal cell having a blue phase liquid crystal layer sandwiched between the first and the second transparent substrates;
a first linear polarizer disposed behind the viewer's side of the liquid crystal layer;
a second linear polarizer disposed on the viewer's side of the liquid crystal layer;
at least one optical retardation compensator disposed between the first and second linear polarizers;
plural pixels with patterned driving electrodes are formed on the first or the second substrates, further comprising
a first patterned pixel electrode used as the first driving pixel electrode on the first substrate;
a second electrode used as the first common electrode on the first substrate;
a third patterned pixel electrode used as the driving second pixel electrode on the second substrate;
a fourth electrode used as the second common electrode on the second substrate;
wherein each of the pixel electrodes has a substantial electrode height over 0.5 μm formed above the substrate surface into the LC bulk region to penetrate substantial electric fields into the HPLC cell, and the driving electric fields from these electrodes induce the birefringence for the light to gain phase retardation to different gray levels.

* * * * *